Jan. 26, 1960     C. B. WEIDNER     2,922,323
AUTOMATIC HIGH SPEED DEEP HOLE DRILLING MACHINE
Filed June 18, 1953     11 Sheets-Sheet 2
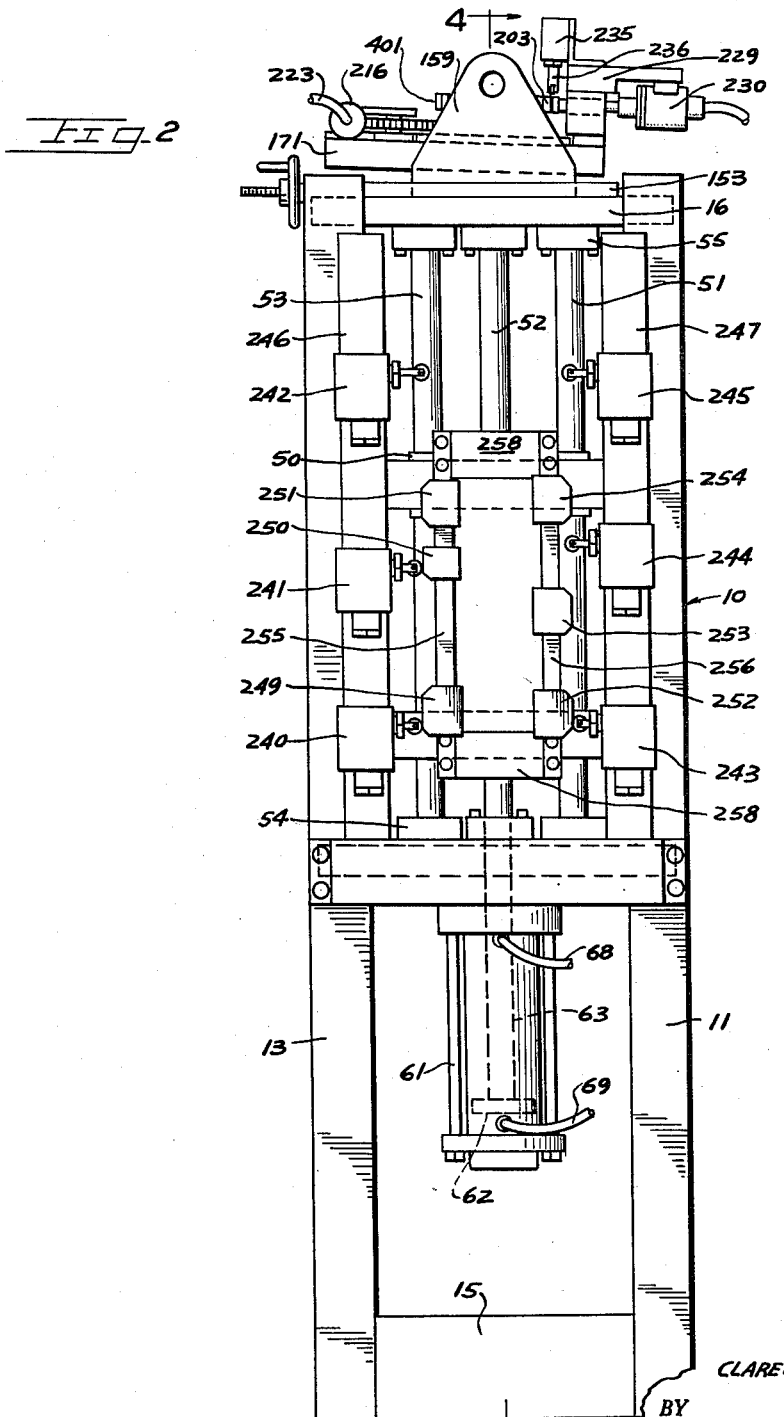
INVENTOR.
CLARENCE B. WEIDNER.
BY
ATTORNEY.

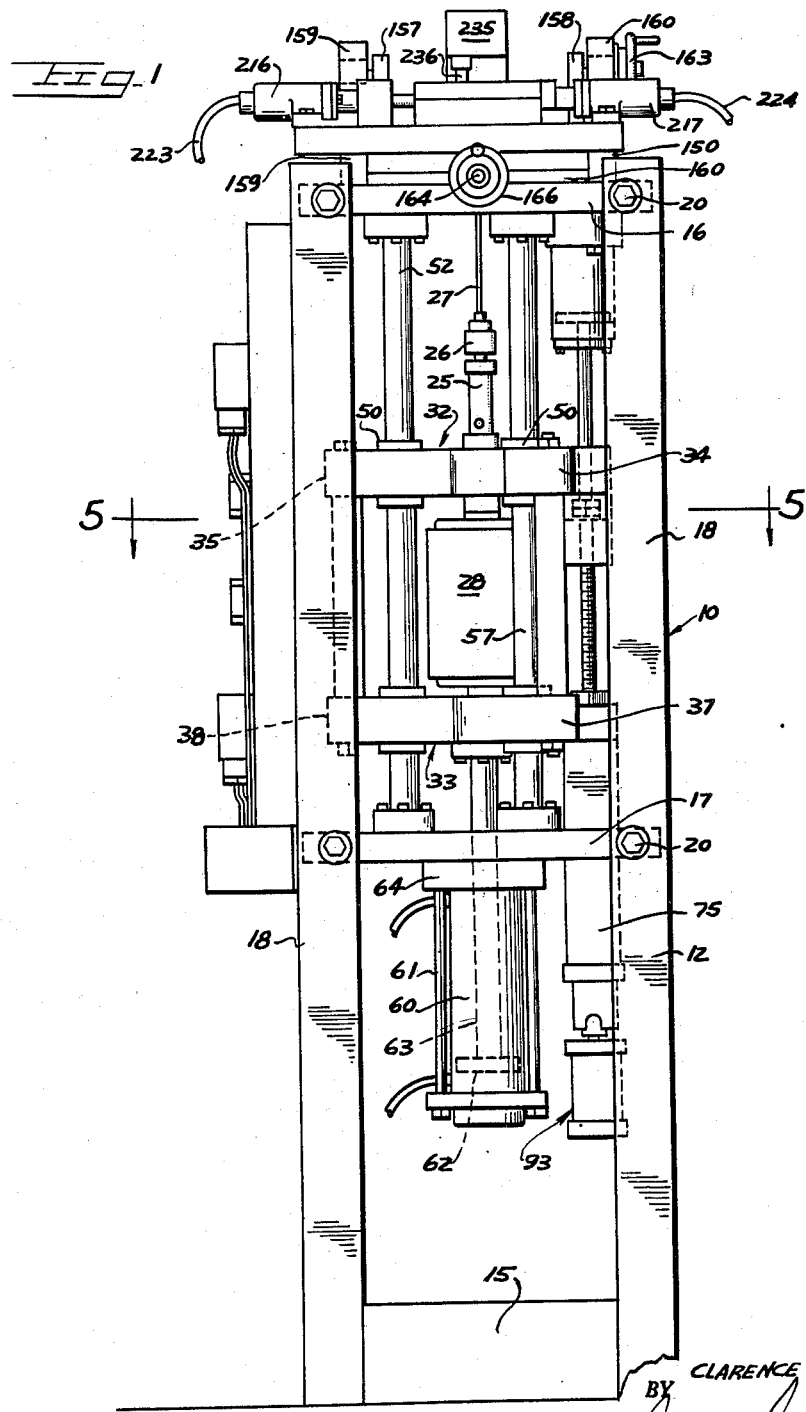

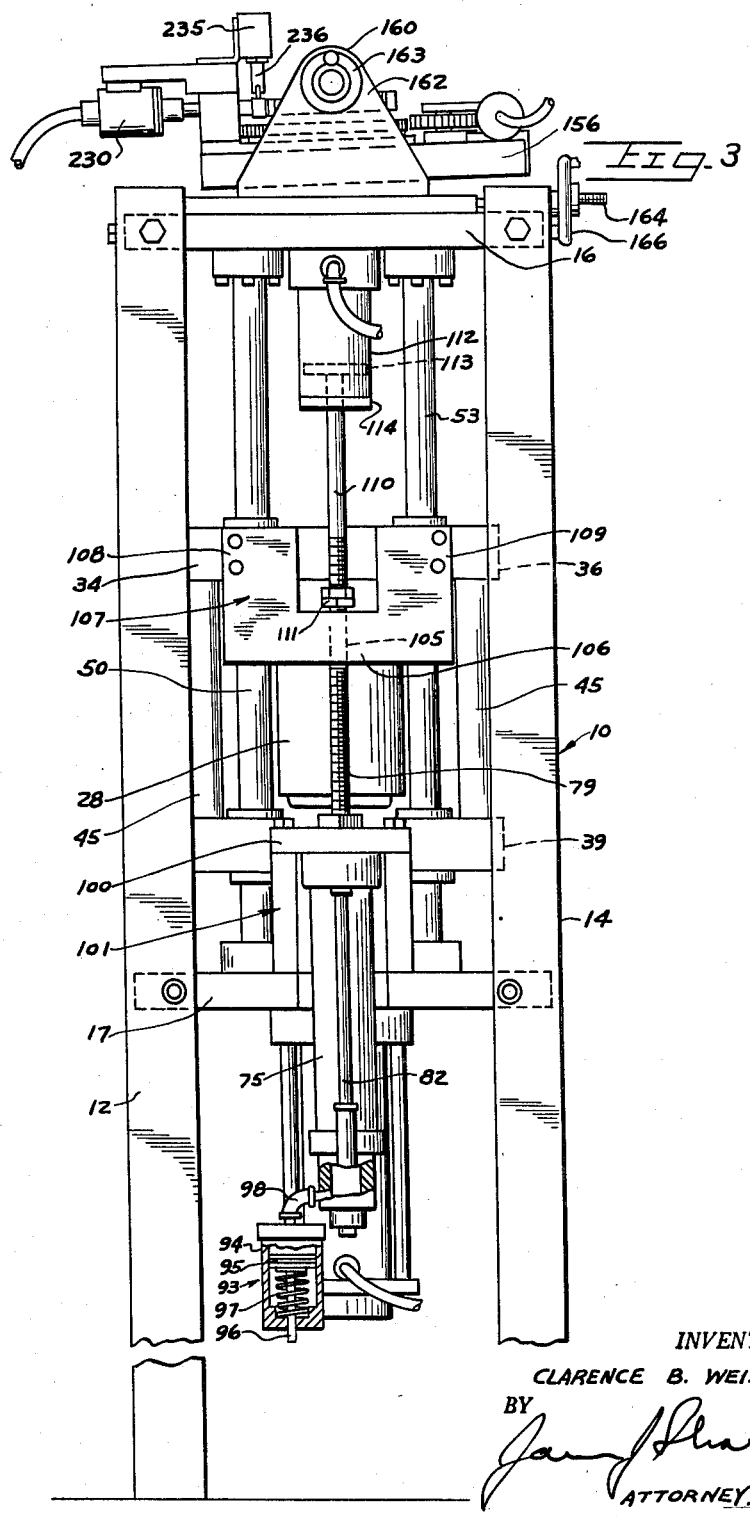

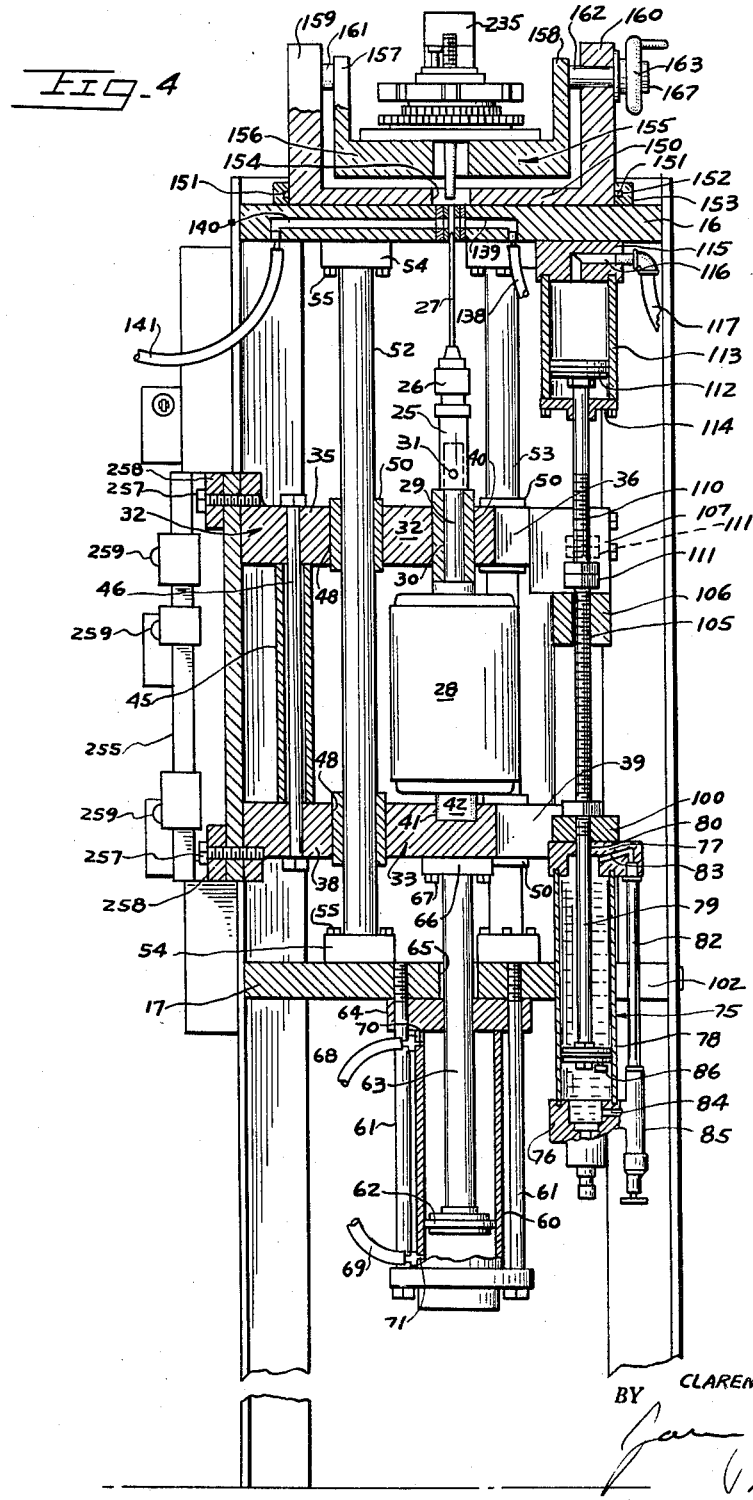

Jan. 26, 1960
C. B. WEIDNER
2,922,323
AUTOMATIC HIGH SPEED DEEP HOLE DRILLING MACHINE
Filed June 18, 1953
11 Sheets-Sheet 5
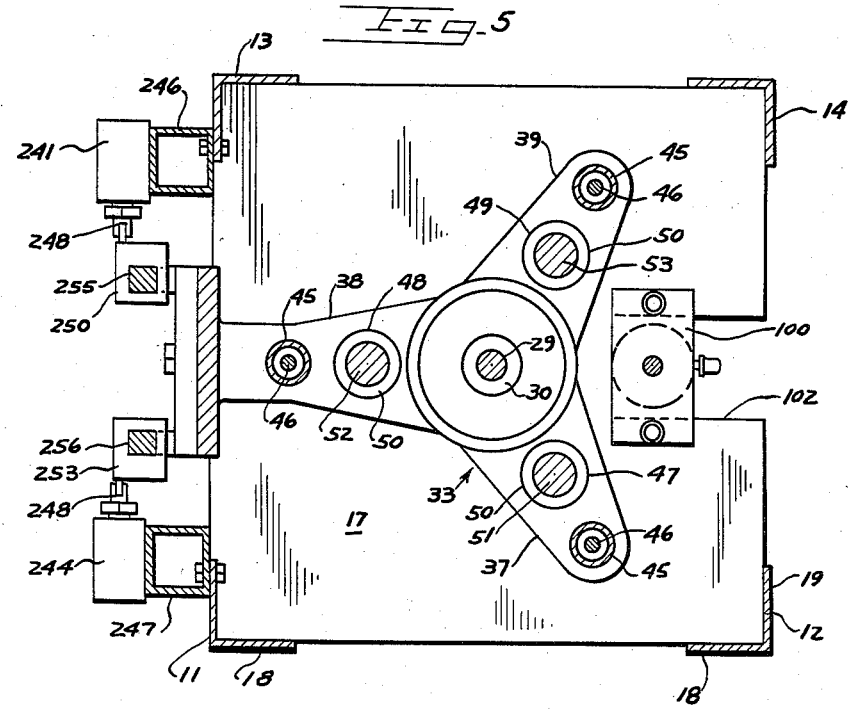
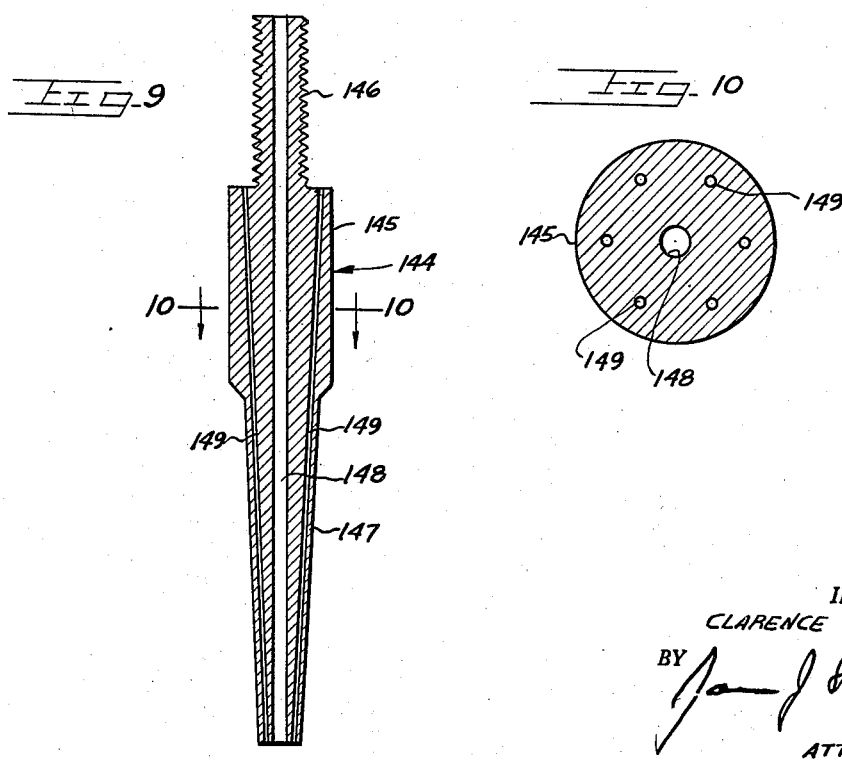
INVENTOR.
CLARENCE B. WEIDNER.
BY
ATTORNEY.

Jan. 26, 1960  C. B. WEIDNER  2,922,323
AUTOMATIC HIGH SPEED DEEP HOLE DRILLING MACHINE
Filed June 18, 1953  11 Sheets-Sheet 6
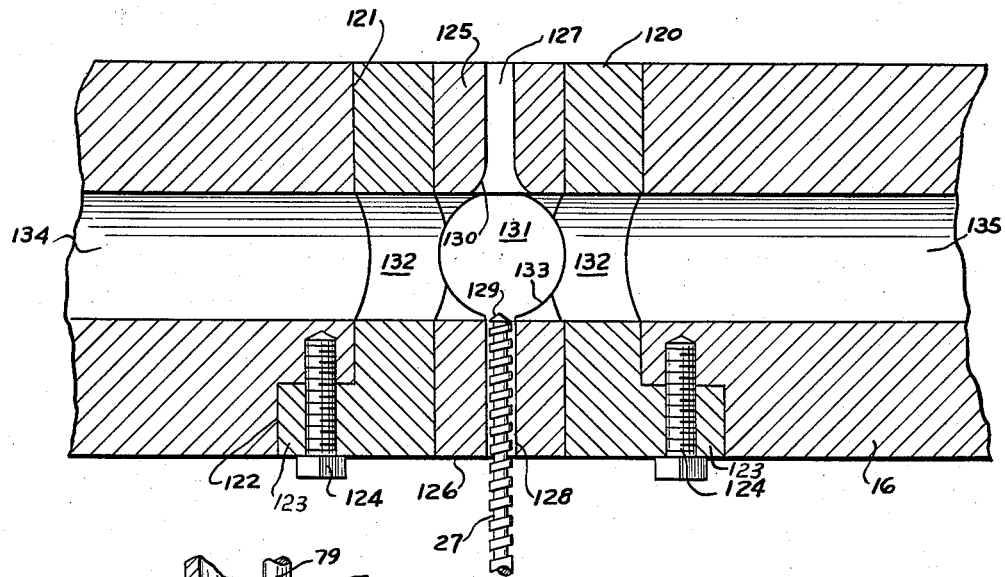
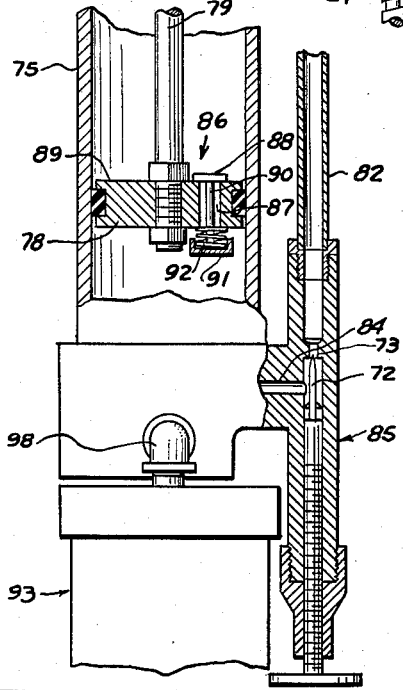
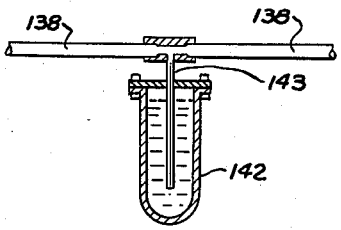
INVENTOR
CLARENCE B. WEIDNER.
BY
ATTORNEY

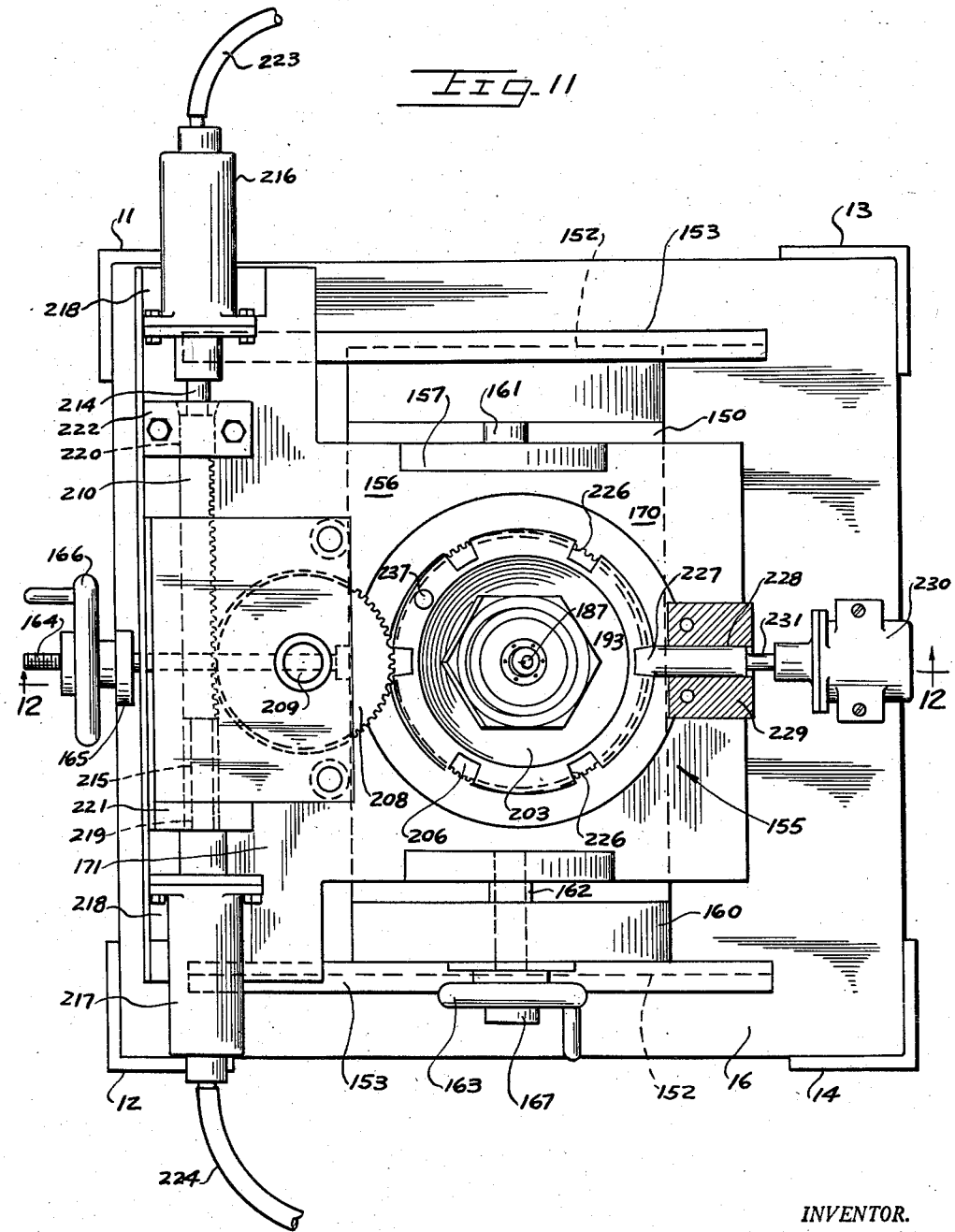

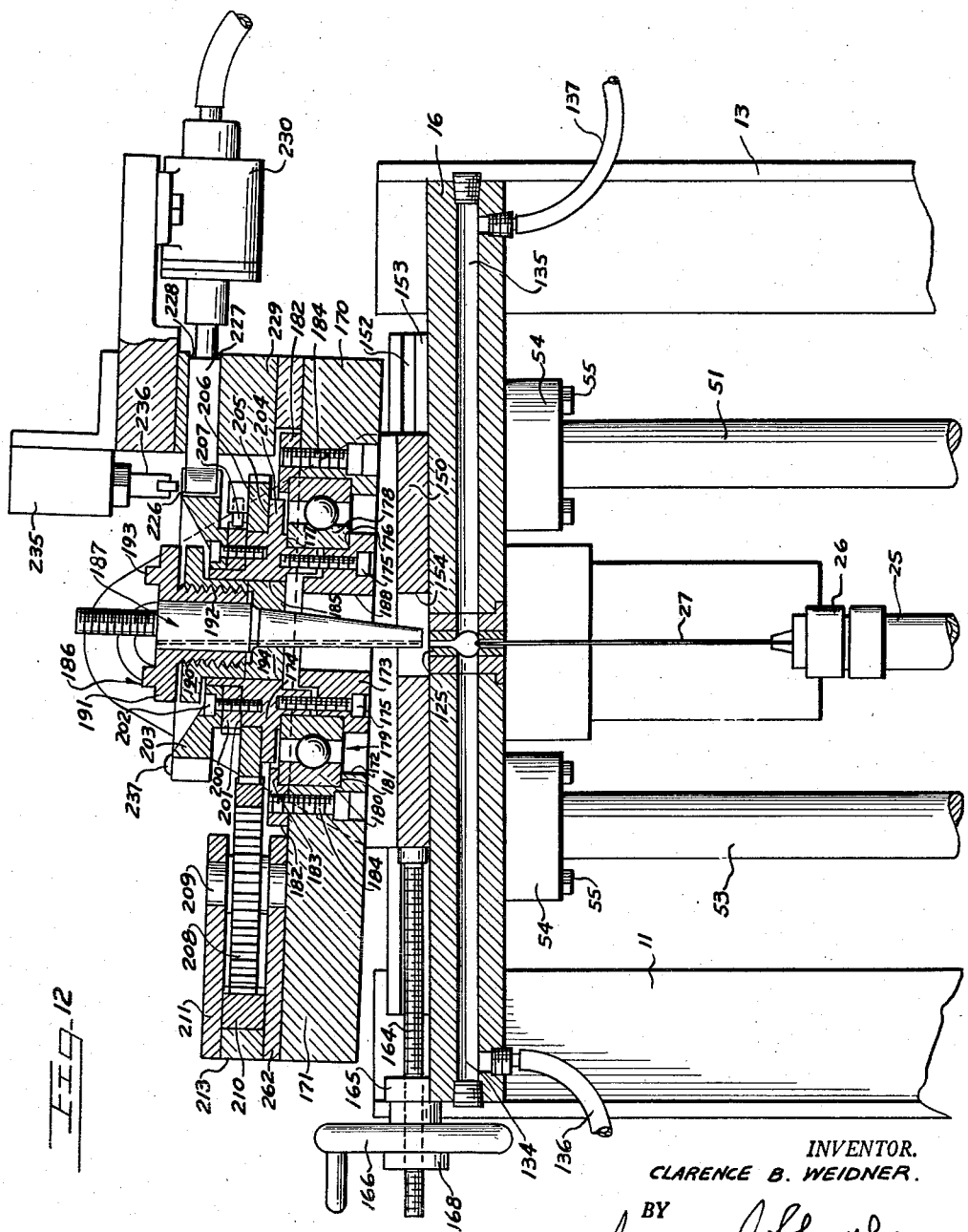

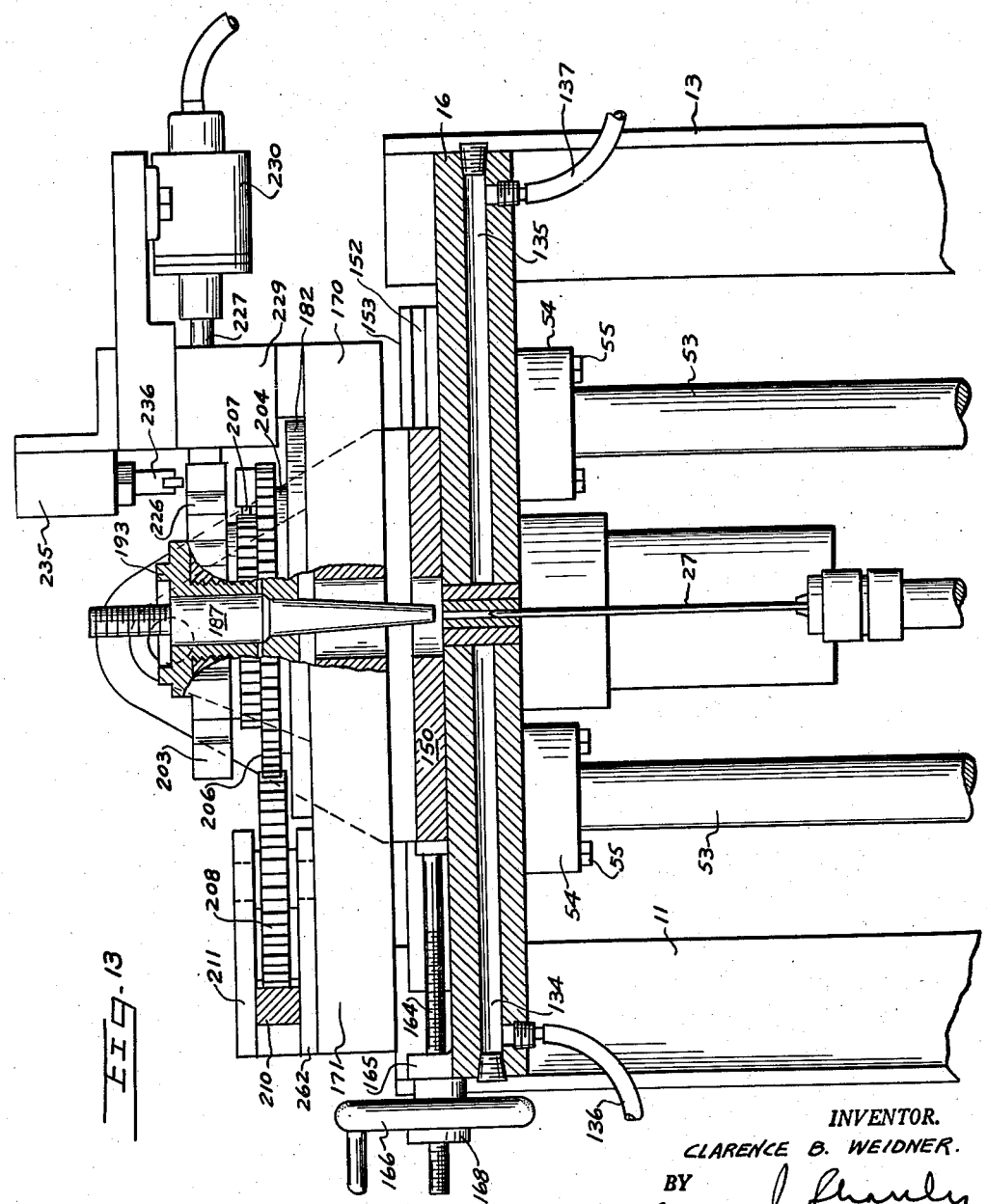

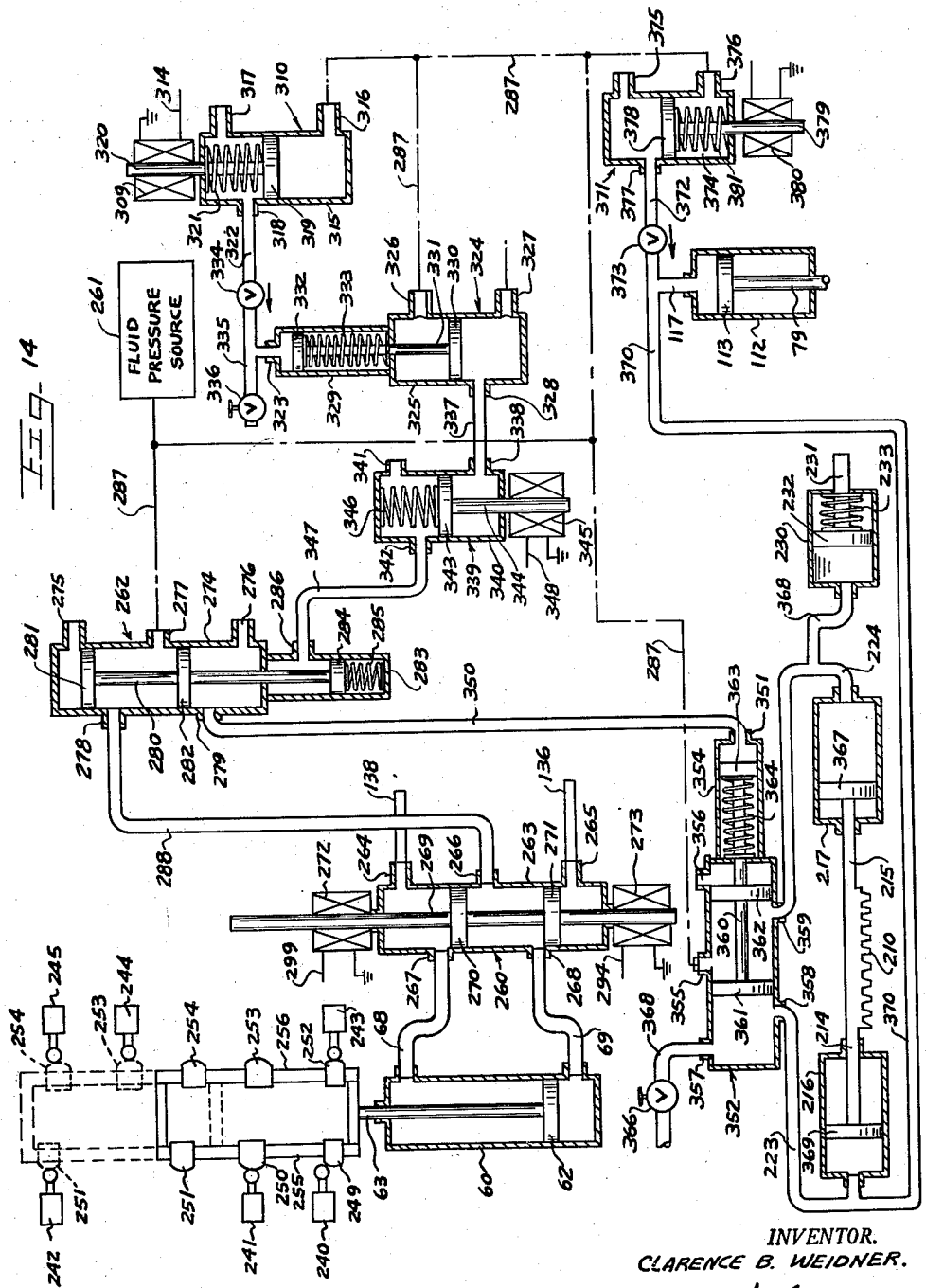

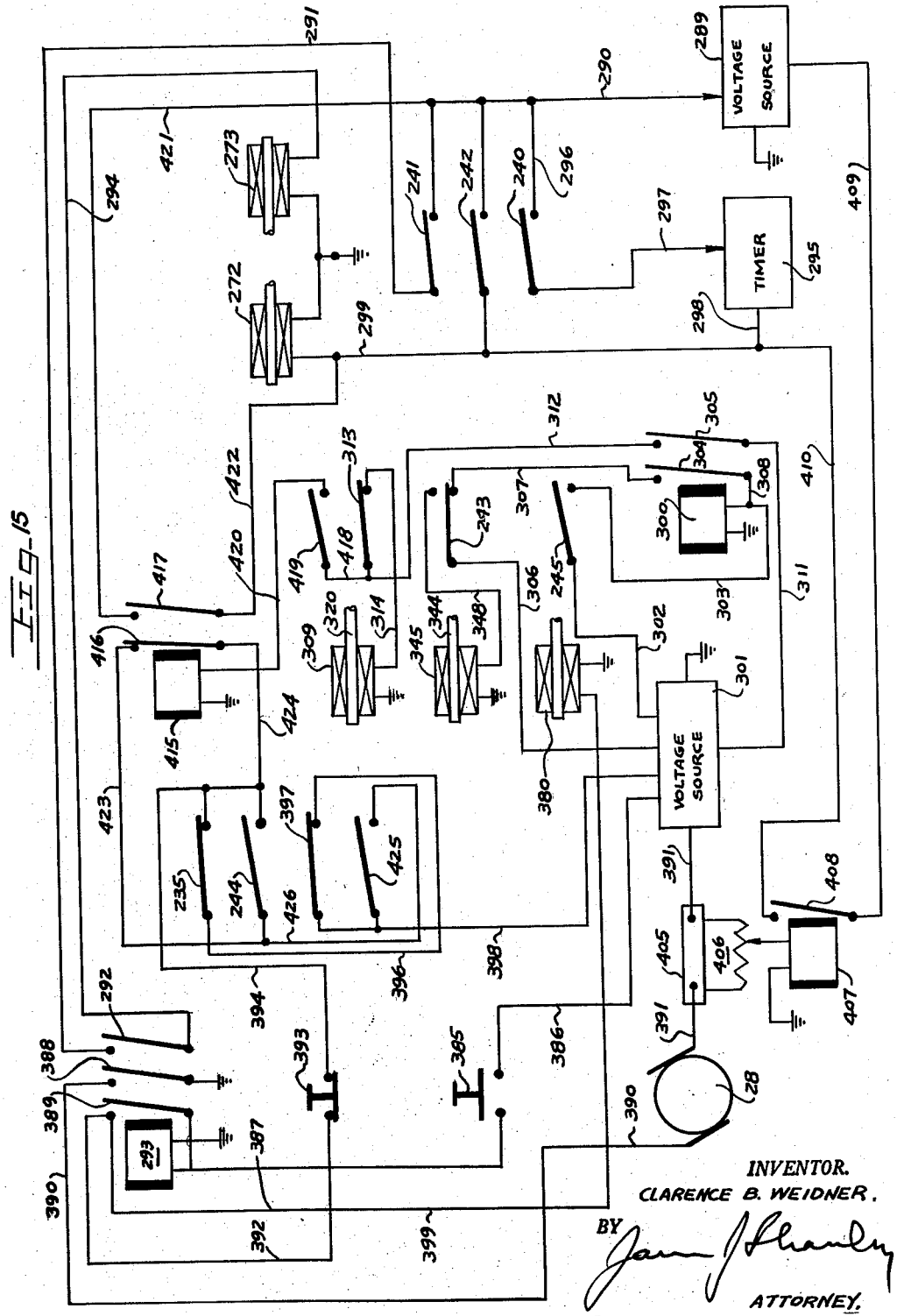

United States Patent Office 2,922,323
Patented Jan. 26, 1960

2,922,323

AUTOMATIC HIGH SPEED DEEP HOLE DRILLING MACHINE

Clarence B. Weidner, Emmaus, Pa., assignor to Air Products Incorporated, a corporation of Michigan Application June 18, 1953, Serial No. 362,571

31 Claims. (Cl. 77—32.2)

This invention relates to automatic drilling machines and more particularly to an automatic machine for drilling small diameter, deep holes at a high rate of speed.

The present invention is disclosed in the form of a machine designed for automatically drilling, at a high rate of speed, a series of preheating passageways, or a central passageway, in the blank of a cutting torch tip. It is to be expressly understood, however, that the novel features provided by the present invention may be incorporated in machines designed for drilling small diameter, deep holes in other elements, such as for drilling oil passageways in crank shafts, and that the invention is not intended to be restricted to use in the disclosed environment.

For deep hole drilling, especially high speed deep hole drilling with automatic machines, it is necessary to provide an arrangement for adequately supporting the elongated drill of relatively small diameter to prevent flexing of the drill due to the feed thrust, especially at the beginning of the drilling operation. The prior art provides various forms of elongated bushings which materially reduce the depth of hole that may be produced from a drill of a particular length and which also prevents inadequate chip clearance resulting in frequent drill breakage unless the drill is withdrawn from the work and refed into the work at abnormally high intervals materially reducing the machine output. Deep hole drilling machines provided heretofore include step drilling arrangements for repeatedly withdrawing the drill from the work and for repeatedly returning the drill to the work at a high speed and for feeding the drill into the work at a relatively slow speed, in which the feeding period of each cycle progressively decreases as the depth of the hole increases. However, these arrangements are extremely complex devices of hydraulic, electrical and mechanical elements not readily adjustable to different drilling conditions and not adapted for extremely high speed drilling operations, especially for use in automatic machines designed for drilling holes of extremely small diameter.

It is therefore an object of the present invention to provide a novel deep hole drilling machine which overcomes the disadvantages of the prior art arrangements.

Another object is to provide a deep hole drilling machine including a novel drill supporting bushing arrangement presenting adequate drill support without materially decreasing the effective length of the drill and without increasing chip clearance problems.

Another object is to provide a novel drill supporting bushing arrangement designed in such a manner as to improve chip clearance and drill lubrication while presenting a stiffening action for the drill.

Another object is to provide an automatic deep hole drilling machine including a vertically disposed drill adapted to be advanced upwardly toward the work to facilitate chip removal, while providing an arrangement for insuring adequate lubrication of the drill.

Another object is to provide an automatic deep hole drilling machine including a step drilling cycle and provided with a drill supporting arrangement employing fluid pressure means for chip clearance and drill lubrication, operating in synchronism with the step drilling cycle.

Still another object of the present invention is to provide a deep hole drilling machine providing a step drilling operation in which the drill is repeatedly withdrawn from the work and refed into the work, including a novel arrangement of comparatively simple design and construction for automatically establishing a high traverse speed for the drill as it moves with respect to the work and a relatively slow feeding speed as the drill penetrates the work, and automatically progressively decreasing the period of the drill feeding as the depth of the hole increases.

Still another object is to provide a deep hole drilling machine adapted for drilling preheat passageways in a blank for a cutting tip including a universal support for the blank and an indexing mechanism for controllably rotating the support in synchronism with the drilling operation to automatically drill a series of preheat passageways in the blank without requiring intermediate adjustments of the machine.

Still another object is to provide a deep hole drilling machine of the foregoing type provided with a novel control circuit interconnecting the step drilling operation and the indexing operation in such a manner as to insure the drilling of the desired number of passageways in the proper relationship in the blank.

Still another object is to provide in a control circuit of the above type, torque responsive means for retracting the drill from the work when the drill is excessively loaded due to abnormal chip clogging.

A still further object of the invention is to provide a deep hole drilling machine of the above character capable of being adjusted for drilling the central passageway in a blank for a cutting tip.

Other objects and features of the present invention will appear more fully from the following description considered in connection with the accompanying drawings which disclose one embodiment of the invention. It is expressly understood, however, that the drawings are designed for the purposes of illustration only and not as a definition of the limits of the invention, reference for the latter purpose being had to the appended claims.

In the drawings, in which similar reference characters denote similar elements throughout the several views:

Fig. 1 is a view in elevation of the front of an automatic drilling machine embodying the principles of the present invention;

Fig. 2 is a view in elevation of the left-hand side of the machine shown in Fig. 1;

Fig. 3 is a view in elevation of the right-hand side of the machine shown in Fig. 1;

Fig. 4 is a view in longitudinal section taken along the line 4—4 of Fig. 2;

Fig. 5 is a sectional view taken along the line 5—5 of Fig. 3;

Fig. 6 is an enlarged view, partly in section, of a portion of the drilling machine;

Fig. 7 is a sectional view of a drill supporting arrangement provided by the present invention;

Fig. 8 is a diagrammatic view of another feature of the present invention;

Fig. 9 is a view in longitudinal section of a tip of the type that may be drilled by a drilling machine embodying the principles of the present invention;

Fig. 10 is a view in section taken along the line 10—10 of Fig. 9;

Fig. 11 is a top plan view of the machine shown in Fig. 1;

Fig. 12 is a sectional view of the upper portion of the drilling machine shown in Fig. 1 taken along the line 12—12 of Fig. 11;

Fig. 13 is a sectional view of the upper portion of a drilling machine adjusted for center hole drilling;

Fig. 14 is a diagrammatic presentation of a hydraulic control circuit for the machine shown in Fig. 1, and Fig. 15 is a diagrammatic showing of an electrical control circuit for the machine shown in Fig. 1.

With reference more particularly to Figs. 1 through 5 of the drawings, an automatic drilling machine adapted for drilling elongated, relatively small diameter passageways in tips for cutting torches and embodying the principles of the present invention, is disclosed therein comprising a frame 10 including vertical supporting column members 11, 12, 13 and 14, a base plate 15, a top plate 16 and an intermediate plate 17. The vertical column supporting members comprise members of right-angle cross-section presenting flanges 18 and 19. The vertical column supporting members may be located at the corners of the rectangularly-shaped base, top and intermediate plates and support these plates in parallel horizontal planes by any suitable connecting means such as studs 20 passing through the flanges 18 and 19 and being secured to the plates 15, 16 and 17 by a threaded connection.

The machine is provided with a tool holder comprising a vertically disposed and rotatably mounted spindle 25 carrying at its upper end a chuck 26 which may be of conventional construction. The chuck 26 removably supports a drill 27 of the type having an extremely long length as compared to its diameter. By means of a structural arrangement described more fully below, the spindle 25 is mounted with respect to the frame 10 so that the longitdinal axis of the drill 27 is vertically disposed and is substantially coincident with the center portions of the base, top and intermediate plates 15, 16 and 17. The spindle 25 is rotated by means of a high speed electric motor 28 of the variable speed type. The motor is provided with a vertically disposed drive shaft 29 mounted in a bearing 30, and is connected to the spindle 25 by any suitable means such as by a splined connection or by means of a pin 31, as shown.

The tool holder is supported on a carriage mounted for vertical reciprocating movement relative to the frame 10. As will appear more fully from the following description, the arrangement is such that the tool holder may be reciprocated from a fully retracted position, as shown in the drawings, toward a fully advanced position and back to the fully retracted position. The reciprocating carriage comprises upper and lower spaced spider frame members 32 and 33, the spider frame member 32 including 120° disposed radial arms 34, 35 and 36 and the spider frame member 33 including similarly disposed radial arms 37, 38 and 39. The spider frame member 32 is provided with a centrally disposed opening 40 for receiving and supporting the bearing 30, while the spider frame member 33 has a rectangular recess 41 in the region of its central portion to receive a complementary rectangular extension member 42 projecting downwardly from the bottom side of the motor 28. The spider frame members are joined together to support the motor 28 therebetween by means of sleeve spacer members 45 and cooperating tie rods 46 located near the end of each of the radial arms. The spider frame members are in parallel relation and are orientated so that the radial arms of the lower spider frame member lie beneath corresponding radial arms of the upper spider frame member, with the tie rods 46 being parallel to each other.

Corresponding radial arms of the spider frame members 32 and 33 are provided with pairs of vertically aligned openings 47, 48 and 49, respectively. The vertically aligned openings each receive a bearing member 50 for slidably mounting the spider frame members on vertically disposed cylindrical rod members 51, 52 and 53, each cylindrical rod member being received by the bearings 50 of one pair of vertically aligned openings. In particular, the corresponding radial arms 34 and 37 are slidably supported on the cylindrical rod member 51, while the other pairs of corresponding radial arms of the spider frame members are supported by the cylindrical rod members 52 and 53. The cylindrical rod members extend between the top plate 16 and the intermediate plate 17 and are rigidly secured to the frame 10 by means of end terminal blocks secured to the plates 16 and 17 by studs 55. The cylindrical rod members may be equally disposed about the vertical central axis of the frame 10, with their longitudinal axes parallel to the central longitudinal axis of the spindle 25 and the drill 27.

The tool holder carriage, including the spider frame members 32 and 33, is reciprocated on the cylindrical rod members by means of a fluid-actuated power cylinder 60. The power cylinder 60 is secured to the lower side of the intermediate plate 17 by means of elongated studs 61, and includes a piston 62 and a piston rod 63 secured to the piston and extending through the upper end wall 64 of the cylinder and a central opening 65 in the intermediate plate 17, and being provided with a terminating flange plate 66 secured to the bottom side of the spider flange member 33 by means of studs 67. The power cylinder is energized with fluid pressure through conduits 68 or 69 which communicate to within the cylinder on the opposite sides of the piston through ports 70 and 71, respectively. With this arrangement, when fluid pressure is introduced through the port 71, with the port 70 connected to exhaust, the piston 62 will move upwardly, as viewed in the drawing, moving the spider frame members 32 and 33, the spindle 25 and the drill 27 upwardly relative to the frame 10. When a source of fluid pressure is introduced through the port 70, with the port 71 connected to exhaust, the piston 62 will move downwardly in the cylinder 60 moving the spindle 25 and the drill 27 downwardly therewith. The stroke of the piston 62 is at least equal to the maximum required vertical movement of the drill 27. However, as will appear more fully below, the stroke of the piston 62 does not necessarily determine the extent of vertical movement of the drill 27, although the fully retracted position of the drill 27 may correspond to the normal position of the piston 62 at the end of its downward stroke. It is preferable, however, to provide a cylinder having a long stroke and to include an adjustable mechanical stop to establish the fully retracted position of the drill in cases where the maximum required vertical displacement of the drill is less than the stroke of the power cylinder.

As mentioned above, one of the objects of the present invention is to provide a novel step drilling arrangement for repeatedly retracting the drill from the work piece and for repeatedly refeeding the drill into the work piece in such a manner as to provide a rapid traverse speed and a relatively slow feeding speed, and for controlling the depth of penetration of the drill upon each feeding of the drill in such a manner so that the depth of penetration progressively decreases as the depth of the drilled hole in the work piece increases with the arrangement being so characterized that the drilling cycle may be readily changed to suit different drilling conditions without requiring other adjustments.

The foregoing means comprises a hydraulic control device mechanically connected to the carriage supporting the tool holder. The hydraulic control means includes a cylinder 75 closed at its ends by end plates 76 and 77 and enclosing a piston 78 carrying a piston rod 79 extending outwardly through an opening 80 in the end plate 77. The space within cylinder 75 on both sides of the piston 78 is filled with hydraulic fluid, and a conduit 82 is provided for transferring hydraulic fluid from the space in the cylinder above the piston to the space within the cylinder below the piston 78 upon upward movement of the piston. The conduit 82 communicates with the upper end of the cylinder through a port 83 in the end plate 77, and with the space within the cylinder on the lower side of the piston by means of a port 84 in the end plate 76 and a metering valve 85. As shown in Fig. 6, the metering valve 85 includes an adjustable valve stem 72 adapted to cooperate with a restricted passageway 73 to control the rate of flow of hydraulic fluid from the conduit 82 into the port 84. Thus with this arrangement, since the hydraulic fluid is substantially incompressible, adjustment of the metering valve 85 determines the force required to move the piston 78 upwardly relative to the cylinder 75.

In order to allow the piston 78 to be moved downwardly in the cylinder independently of the restricting effect presented by the metering valve 85, a by-pass check valve 86 is provided in the piston. The by-pass valve 86 is unidirectional and designed to provide for the flow of hydraulic fluid through a port 87 passing through the piston from the space within the cylinder beneath the piston to the space within the cylinder above the piston when a higher pressure exists on the lower side of the piston upon its downward movement. This valve may be of any suitable construction and may include a valve member 88 adapted to lie on the top surface 89 of the piston to close the port 87. A valve stem 90 is connected to the valve member 88 and extends through the port 87 and is joined on the other side of the piston to a spring-retaining member 91 for receiving a spring 92 which maintains the valve in the closed position as shown. With this arrangement, when the piston 78 is moved downwardly, the resulting pressure increase in the space beneath the piston due to the restricting effect of the metering valve 85 causes the valve 86 to move to its open position and thus allow the fluid to flow through the port 87 and eliminate the restricting effect of the valve 85.

The cylinder 75 may be provided with an accumulator 93 in order to compensate for volumetric displacement of the piston 78, for temperature changes and for any slight leakage of the hydraulic fluid. The accumulator comprises a closed cylinder 94 enclosing a piston 95 connected to a piston rod 96. The space within the cylinder 94 on one side of the piston 95 houses a spring 97 urging the piston upwardly, as viewed in the drawing. The space within the cylinder on the other side of the piston 95 is filled with hydraulic fluid and is in communication with the lower end of the cylinder 78 through a conduit 98.

The cylinder 75 is secured to the upper portion 100 of a U-shaped bracket 101 supported on the intermediate plate 17 of the frame 10. In order to mount the cylinder 78 within the frame 10, the intermediate plate 17 may be slotted at 102 for receiving the cylinder. The piston rod 79 extends upwardly and passes through an enlarged opening 105 in an intermediate portion 106 of a U-shaped bracket 107. The upwardly extending arms 108 and 109 of the bracket 107 are bolted to the radial arms 35 and 36, respectively, of the spider frame member 32. The piston rod 79 is provided with threads 110 in the region of the bracket 107 and a nut 111 engages the threads 110 for adjustable support on the piston rods 78 above the intermediate portion 106. The nut 111 may comprise a split nut arrangement which may be positively locked at a predetermined position on the piston rod 79. The function of the nut 111 will be described more fully below. The piston rod 79 extends upwardly beyond the threaded portion 110 and its upper end is rigidly connected to a piston 112 slidably mounted in a cylinder 113. The lower end of the cylinder 112 is closed by a cover plate 114 including an enlarged opening for the passage of the rod 79, and its upper end is provided with a supporting cover plate 115 secured to the undersides of the top plate 16. The plate 115 is provided with a port 116 connected to a conduit 117 for supplying, at predetermined controlled instances in a manner described below, fluid pressure to within the cylinder 112 on top of the piston 113 for moving the piston and the piston rod 79 downwardly to the position shown in the drawings.

With the foregoing arrangement, assuming that the various elements thereof are in the positions shown in Fig. 4 of the drawings, when a source of fluid pressure is introduced into the cylinder 60 to move the piston 62 and hence, the spider frame members upwardly, the bracket 106 will move therewith sliding over the piston rod 79. As this upward movement progresses the bracket 106 will contact the nut 111, and thereafter the piston rod 79 will move upwardly with the piston 62. Since upward movement of the piston rod 79 necessitates a sufficient force to transfer the hydraulic fluid in the space within the cylinder 75 above the piston 78 through the metering valve 85, further upward movement of the piston 62 following contact between the bracket 106 and the nut 111 is at a reduced speed as compared to the speed of the upward movement of the piston prior to the contact.

As will be described more fully below, means are provided for cyclical energization with fluid pressure, for a predetermined constant, but adjustable time interval less than the period of the cyclical energization, the conduit 69 feeding fluid pressure to the lower end of the cylinder 60 to urge the piston 62 upwardly throughout the duration of the predetermined time interval, and for supplying fluid pressure to the conduit 68 to effect downward movement of the piston 62 to its fully retracted position following termination of each predetermined time interval and prior to the next cyclical energization of the conduit 69. For the first cyclical energization, during the first portion of the time interval the piston 62 will move upwardly at a high speed independently of the piston 78, while during the remaining portion of the time interval the piston 62 will move upwardly with the piston 78 at a relatively slower speed moving the nut 111 to an advanced position, shown in broken lines for example, at the termination of the time interval. Prior to the second cyclical energization the piston 62 is returned to its fully retracted position, and a greater portion of the second time interval is required in moving the tool holder upwardly to establish contact between the bracket 106 and the nut 111, due to the advanced position of the nut 111, and consequently, a less portion of the second time interval is spent in moving the nut 111 to a further advanced position. Since the nut 111 is further advanced upwardly relative to the frame 10 for each cyclical energization, a larger portion of successive time intervals of energization will be required to move the tool holder into contact with the nut 111 and thus leaving a less portion of each time interval for further advancement of the nut 111, which portion progressively decreases with successive time intervals. After a number of cycles of energization the nut 111 will be advanced to its maximum position in which position the drill will be advanced upwardly an amount sufficient to drill a hole of desired depth. Thereafter, fluid pressure may be introduced into the cylinder 113 above the piston 112 by way of the conduit 117 to move the piston 78 downwardly to its normal position shown and thus condition the apparatus for initiating another succession of cyclical fluid pressure energization of the power cylinder 60.

The controlled reciprocation of the tool holder provides periodic withdrawal followed by refeeding of the drill with respect to the workpiece for adequate chip clearance, drill cooling and lubrication. The hydraulic control means, operating with the reciprocating tool holder, automatically functions to provide a rapid traverse and a relatively slow feed rate for the drill, as well as reducing the feed time per cycle of energization, that is, the actual drilling time, as the depth of the drilled hole increases.

As mentioned heretofore, it is contemplated by the present invention to provide a novel construction for supporting relatively long, small diameter drills which may be employed with an automatic deep hole drilling machine of the type provided by the present invention. The drill supporting structure provides a stiffening action for the drill and overcomes disadvantages resulting from drill bending and flexing due to the feed thrust, while also providing an arrangement for positively removing the chips and for cooling and lubricating the drill. As shown more clearly in Fig. 7 of the drawings, a drill supporting construction embodying the principles of the present invention is disclosed therein comprising a housing member 120. The housing member may be of cylindrical form and adapted for mounting in a suitable opening 121 extending through the top plate 16 concentric with the longitudinal axis of the drill. At the lower side of the plate 16 the opening 121 merges into an enlarged opening 122 for receiving a complementary outwardly extending cylindrical flange 123 of the housing 120. The housing may be secured to the plate 16 by studs 124 extending through the flange 123. With this arrangement, housings designed for supporting drills of different size may be readily installed in the machine.

The housing 120 carries an upper bushing 125 and a spaced lower bushing 126. The bushings 125 and 126 are provided with axially aligned openings or passageways 127 and 128, respectively, with their central vertical axes being coincident with the vertical longitudinal axis of the drill. The aligned openings are of equal diameter corresponding to the diameter of the hole drilled by the drill with which the bushings are designed for use. The upper surface of the bushing 125 may be coplanar with the upper surface of the plate 16, and the bushings may be of equal length with their adjacent end surfaces spaced a distance in the neighborhood of five times the drill diameter. In the preferred operation, the drill remains in the lower bushing 126 with the end 129 of the drill in the region of the upper end of the passageway 128 when the drill is in fully retracted position. The lower end of the bushing 127 is provided with a circumferential, flared portion 130 about the inlet to the passageway 127 for guiding the drill into the passageway 127 as it moves upwardly through the bushing. The lower bushing 126 is of sufficient length to eliminate flexing from that portion of the drill extending upwardly beyond the bushing 126, and the bushing 125, preferably in contiguous relation with the work, provides support for the drill especially during the initial drilling. The spacing between the bushings of the order of five times the drill diameter is insufficient for formation of substantial flexing of the drill.

Employing spaced bushings in the manner described above eliminates disadvantages resulting from the use of elongated bushings for supporting long drills, and provides for substantially complete chip clearance, drill cooling and adequate lubrication which is especially critical in the preferred type of drilling machine in which the drill is fed upwardly from beneath the workpiece. For this purpose, pairs of horizontally disposed ports are drilled in the housing 120 in communication with the cylindrical space 131 between the bushings 125 and 126. One pair of ports 132—132 extend in axial alignment through the center of the space 131 perpendicular to the vertical axis of the housing 120. The other pair of ports 133—133 extend in axial alignment through the center of the space 131 in quadrature relation with the ports 132—132. One pair of ports, such as the ports 132, are employed for chip clearance, while the other pair of ports 133 function as means for lubricating the drill, while all ports aid in reducing the temperature of the drill. As will be described more fully hereinafter, one of the ports 132 communicates with a passageway 134 in the top plate 16 supplied with a source of fluid pressure, such as compressed air, through a conduit 136 at predetermined intervals during operation of the machine. In particular, as the drill begins its downward movement fluid pressure from the passageway 134 is directed onto the drill removing chips therefrom and cooling the drill. The fluid pressure carries the chips from the space 131, through the other port 132, and into a passageway 135 which may be provided in the top plate 16 in diametric relation with the passageway 134 communicating with an exhaust conduit 137. As the drill begins its upward movement at the beginning of another drilling cycle, a source of fluid pressure carrying vaporized oil is introduced by way of a conduit 138 and a passageway 139 (Fig. 4) in the top plate 16 into one of the ports 133 to direct an oil mist onto the drill. This operation provides adequate lubrication for the inverted drill and further reduces its temperature. The fluid pressure carrying the lubricating oil passes through the other port 133 and is conducted from the machine through a passageway 140 in the cover plate 16 and an exhaust conduit 141. Application of the fluid pressure blast for chip removal and of the oily blast for lubrication are synchronized with the cyclical energization of the power cylinder 60 in a manner that will be described more fully below. As shown in Fig. 8, oil in a reservoir 142 may be added to the stream of fluid pressure in the conduit 138 by means of a conduit 143 having one end terminated within the conduit and the other end within the reservoir.

While the present invention is disclosed in the form of a machine for drilling preheating and center holes in tips for metal cutting torches, it is expressly understood the the principles of the present invention may be employed in connection with other drilling operations by providing suitable means for supporting the article to be drilled on the top surface of the plate 16 in contiguous relation with the upper end of the opening 127 in the bushing 125. It is also expressly understood that the principles of the present invention may be employed in connection with downwardly disposed vertical drills, horizontal drills or in drilling operations in which the drill is necessarily positioned at different angles to perform the drilling function.

The type of cutting tip upon which the drilling machine provided by the present invention is adapted to operate is shown in Figs. 9 and 10. As shown, the cutting tip 144 includes a cylindrical intermediate portion 145, a threaded shank 146 extending upwardly from the intermediate portion and a tapered portion 147 extending from the bottom side of the intermediate portion and terminating in a small diameter flame end. An enlarged, centrally disposed passageway 148 is drilled longitudinally of the tip throughout the portions 145, 146 and 147 for passage of the gaseous mixture forming the metal cutting flame. A plurality of small diameter holes 149 conduct gases to the flame end of the tip for forming the preheating flame. The preheating passageways 149 are equally disposed about a circle concentric with the central passageway 148 and lie parallel to the surface of the tapered portion 147.

The present invention provides a universally mounted supporting means for receiving a tip blank to be drilled and for positioning the tip blank in proper relation with the drill 27, and an indexing mechanism operable in synchronism with the control circuits for the reciprocating tool holder for automatically drilling the small preheat holes 149 during a single operation of the machine.

The foregoing arrangement includes a rectangular base plate 150 slidably mounted on the upper surface of the top plate 16. The base plate 150 is provided at opposite sides with longitudinal extensions 151 projecting outwardly therefrom and being slidably mounted in ways 152 formed by parallel strip elements 153 secured to the top surface of the plate 16. With this arrangement the base plate 150 is mounted only for lateral movement relative to the top plate 16 of the frame 10 in a direction parallel to the ways 152. The base plate 150 is provided with an like index locking plate 203, the function of which will be described below. The member 174 is also provided with an outwardly extending annular flange 204 presenting a horizontally disposed circumferential shoulder 205 supporting a free-turning annular gear 206. The annular gear 206 has a diameter greater than the diameter of the ratchet gear 200 and carries on its upper face a spring-pressed rachet pawl 207 for engaging the teeth of the rachet gear 200. The arrangement is such that upon rotation of the annular gear 206 in one direction the pawl 207 engages a tooth of the rachet gear 200 and effects rotation of the rachet gear, and hence the tip blank. However, when the gear 206 is rotated in the other direction, the pawl 207 trips over the teeth of the rachet gear 200 and does not effect rotation thereof. The annular gear 206 meshes with a small diameter gear 208 which rotates about a supporting pin 209 secured to the elongated portion 171 of the supporting plate 156 and the gear 208 meshes with a rack 210 mounted on the portion 171 for sliding movement along an axis parallel to the left-hand edge of the elongated portion, as viewed in Fig. 12. The rack 210 and the gear 208 and its supporting pin 209 may be provided with a housing formed from top and bottom supporting plates 211 and 212 and an edge supporting plate 213.

The ends of the rack 210 are operatively connected to piston rods 214 and 215 of single acting, fluid pressure operated cylinders 216 and 217, respectively. The cylinders 216 and 217 may be supported on the elongated portion 171 by means of bracket members 218. The piston rods 214 and 215 may have a diameter materially less than the horizontal or vertical end dimensions of the rack 210 and pass through openings 219 and 220 in stop block members 221 and 222, respectively. The rack 210 is positioned between the stop block members 221 and 222 and the piston rods extend through the openings in the stop block members to actuate the rack. The openings 219 and 220 have a diameter only slightly greater than the diameter of the piston rods so that the stop block members limit movement of the rack in a direction toward respective stop block members. The stop block member 221 is fixed to the portion 171 while the stop block member 222 is adjustably positioned on the member 171 to determine the degree of rotation of the tip blank for each index setting.

With the foregoing arrangement, when the cylinder 217 is energized with fluid pressure supplied by way of a conduit 224 with the cylinder 216 deenergized, the rack 210 will move into contact with the adjustable stop block 222. This movement of the rack rotates the gear 208 in a clockwise direction imparting counterclockwise rotation to the annular gear 206. The spring pressed pawl 207 and the rachet teeth on the rachet gear 200 are designed in such a manner so that upon counterclockwise rotation of the gear 206, the pawl will ride over the rachet teeth of the gear 200 and will not impart rotation thereto. When the cylinder 216 is energized by way of a conduit 223 and the cylinder deenergized, the rack 210 will move in the opposite direction a distance determined by the setting of the adjustable stop block 222. This movement of the rack rotates the gear 208 in a counterclockwise direction, imparting clockwise rotation to the gear 206 and effecting rotation of the annular supporting members 173 and 174, and hence the tip blank 144 through the driving engagement between the pawl 207 and the rachet gear 200. In setting up the indexing arrangement, the number of degrees of rotation of the tip blank upon each indexing operation will be determined by the number of preheat passageways in the series.

The adjustable stop block 222 is thus set so that the amount of movement of the rack 210 upon energization of the cylinder 216 will impart the desired number of degrees of rotation to the tip blank.

The indexing locking plate 203 is provided with a plurality of recesses 226 equally disposed about its periphery. The number of recesses 226 correspond to the number of preheat passageways in the series and are positioned about the periphery of the plate 203 in a manner corresponding to the deposition of the preheating passageways about the central longitudinal axis of the tip. The recesses 226 are adapted to receive a locking pin 227 slidably mounted in a groove 228 of a bracket 229 supported on the portion 170. The locking pin is reciprocated into and out of the recesses upon energization and deenergization of a fluid pressure actuated cylinder 230. The arrangement is such that the locking pin enters one of the recesses after the indexing operation is complete and before reciprocation of the tool holder commences.

A switch 235 is mounted on the bracket 229 and includes a follower 236 adapted to contact a cam 237 for actuating the switch. As will be described below, the switch 235 is included in the overall control circuit for terminating operation of the machine when its follower 236 contacts the cam 237. The cam 237 is positioned on the lock plate 203 in the direction of rotation of the lock plate after the recess corresponding to the last passageway of the series. With this arrangement it is not possible to drill more than one series of passageways in a tip blank for one setting of the machine.

The control circuit for the drilling machine described above operates responsively to certain relative positions of the above tool holder with respect to the frame 10. For this purpose a plurality of switches 240, 241, 242, 243, 244 and 245 are provided. The switches 240, 241 and 242 are mounted on a bracket 246 bolted to the vertical column member 13, and a similar bracket 247 is rigidly secured by bolts to the vertical column member 11 for supporting the switches 243, 244 and 245. The switches are each provided with an actuating member 248, and each of the switches 240, 241, 242, 243, 244 and 245 are adapted to be tripped by cam members 249, 250, 251, 252, 253 and 254, respectively. The cam members are mounted for movement relative to the switches in synchronism with the reciprocating movement of the tool holder. The cam members 249, 250 and 251 are adjustably mounted on a vertically disposed rod member 255, and the cam members 252, 253 and 254 are adjustably mounted on a vertically disposed rod member 256, the rod members 255 and 256 being secured at their ends by means of studs 257 and brackets 258 to the spider frame members 32 and 33. As shown more clearly in Fig. 5, the rod members 255 and 256 may be of rectangular cross section and the cam members may be provided with a rectangular opening for sliding movement on the rods. With this arrangement the cam members may be adjustably positioned with respect to their corresponding switch and positively secured in that position by means of studs 259 threadably mounted in the cam members and adapted to be tightened into engagement with the rod members.

As described above, the cylinder 60 for reciprocating the tool holder is cyclically supplied with fluid pressure for a predetermined time interval through the conduit 69 to move the tool holder upwardly, in which the predetermined time interval is less than the period between cyclical energization of the conduit 69, and in which the conduit 69 is exhausted and the conduit 68 supplied with fluid pressure to move the piston 62 to its fully retracted position after termination of each time interval and before the next cyclical energization of the conduit 69. For this purpose, with reference more particularly to Figs. 14 and 15, the fluid pressure supplied to the cylinder 60 is controlled by a solenoid operated two-position transfer valve 260 which is supplied with fluid pressure from a source 261, such as a source of compressed air, through a two-position pilot operated transfer valve 262. The solenoid operated transfer valve 260 comprises a casing 263 having exhaust ports 264 and 265, a fluid pressure enlarged central opening 154 for allowing the flame end of the tip blank 144 to lie in contiguous relation with the upper surface of the bushing 125. A cradle 155 is mounted for swinging movement above the base plate 150 about an axis perpendicular to the ways 152. The cradle includes a supporting plate 156 and a pair of upstanding supporting members 157 and 158 secured to opposed edges of the supporting plate 156 and extending upwardly from the supporting plate. A pair of upstanding supporting members 159 and 160 are secured to the edges of the base plate 150 parallel to the ways 152 for rotatably supporting the cradle 155. The cradle 155 is rotatably supported on the upstanding supporting members 159 and 160 by means of pins 161 and 162 extending outwardly from the supports 157 and 158, respectively, and being rotatably mounted in suitable bearings in the supports 159 and 160, respectively. With this arrangement the cradle may be rotatably positioned about an axis perpendicular to the direction of lateral movement of the base plate 150. The position of the cradle 155 with respect to the base plate 150 may be adjusted by means of a rotatable hand wheel 163 mounted on the pin 162, and secured in the adjusted position upon rotation of a locking member 167. As shown in Fig. 12, an arrangement is provided for accurately positioning the base plate 150 with respect to the top plate 16 and for positively locking the base plate in the adjusted position. This arrangement may comprise a lead screw 164 secured to the left-hand end of the base plate 150, as viewed in the drawing, and extending outwardly beyond the top plate 16 through a bracket 165 fixed onto the top plate 16. An adjusting wheel 166 provided with a locking member 168 is threadedly mounted on the end of the lead screw 164 extending past the bracket 165 so that the base plate 150 may be moved laterally with respect to the top plate 16 upon rotation of the wheel 166. Rotation of the locking member 168 secures the base plate 150 in its adjusted position with respect to the top plate 16.

The supporting plate 156 of the cradle 155 includes a substantially square portion 170 located between the upstanding supporting members 157 and 158 and centrally positioned with respect to the central vertical axis of the plate 16, and an elongated portion 171 merging from an edge of the portion 170 and extending over the left-hand edge of the top plate 16 as viewed in Figs. 11 and 12. The portion 170 of the supporting plate 156 is provided with a centrally disposed enlarged opening 172 for rotatably receiving a supporting member for the tip blank. The supporting member for the tip blank includes a lower annular member 173 and an upper annular member 174 adapted to be joined together by studs 175 to form a unitary structure. The annular members 173 and 174 present spaced internal circumferential flanges 176 and 177 for clamping therebetween the inner race 178 of a ball bearing assembly 179 upon tightening the studs 175. The outer race 180 of the ball bearing assembly 179 is supported on the portion 170 of the supporting plate 156. For the latter purpose, the lower portion of the opening 172 is of reduced diameter to present a circumferential shoulder 181 for supporting the outer race 180. An annular ring 182, having an internal edge portion cut away to form a circumferential flange 183, is secured to the top of the portion 170 about the periphery of the opening 172 by means of studs 184 to clamp the outer race 180 rigidly onto the supporting plate 156.

The upper annular member 174 is provided with an enlarged centrally disposed opening 185 for receiving a chuck 186 supporting a tip blank 187, and the lower annular member 173 is provided with an enlarged centrally disposed opening 188 for the passage of the tip blank 187 therethrough. The chuck 186 may be of any conventional design capable of positively securing the tip blank 187 in the upper annular member 174 without relative rotational and longitudinal movement, yet being operable to quickly release the tip after the drilling operation so that another tip blank may be inserted into the machine. One form of chuck may comprise a sleeve-like element 190 positioned in the opening 185 and a sleeve-like element 191 engaging the intermediate portion 145 of the tip blank and adapted to be inserted into the member 190. The sleeve-like members 190 and 191 may be provided with radial slots, not shown, and tapered cooperating threads 192 so that the internal diameter of the member 191 decreases and the external diameter of the member 190 increases as the member 191 is threaded downwardly into the member 190. The member 191 may be provided with an upstanding lug 193 adapted to be engaged by a suitable wrench for effecting the chucking and de-chucking operations. The member 190 may be provided at its lower end with an internally extending circumferential projection 194 formed to receive the tip blank around the upper end of the tapered portion 147 to properly position the tip blank relative to the face of the bushing 125.

With the foregoing arrangement, when it is desired to drill the small diameter preheat passageways 149 of a cutting tip of the character shown in Fig. 9, the cradle 155 upon operation of the hand wheel 163 is rotated about the pins 161 and 162 so that the longitudinal axis of the drill 27 is parallel to the tapered surface 147 of the tip blank, and the cradle is locked in this position upon operation of the locking member 167. The hand wheel 166 is then rotated to adjustably position the base plate 150 with respect to the drill to locate the centers of the preheat holes 149 on a circular locus of desired radius about the central axis of the tip blank. The locking member 168 may be operated to secure the base plate against relative movement with respect to the drill. Suitable micrometer adjusting means and gauges may be provided for readily effecting these adjustments with a high degree of accuracy. When it is desired to adjust the machine for drilling the enlarged centrally disposed passageway 148, the cradle 155 and the base plate 150 are adjusted to occupy the positions shown in Fig. 13 of the drawings. In this position, the cradle 155 occupies a true horizontal relation with respect to the base plate 150 with the longitudinal axis of the tip blank parallel with the longitudinal axis of the drill 27. Also, the relative position of base plate 150 relative to the top plate 16 is such that the parallel axes of the drill and the tip blank are in concentric relation.

As discussed above, the present invention provides an automatic indexing arrangement operable when the machine is set up to drill the preheat passageway 149, so that a complete series of preheat passageways is drilled in a tip blank automatically without requiring interposed adjustments. The indexing arrangement functions to rotate the annular supporting members 173 and 174 relative to the supporting plate 156 about the ball bearing assembly 179 and hence, the tip blank, in increments equal to a predetermined number of degrees following complete drilling of each preheat passageway of the series. The number of degrees of rotation is selected to provide the desired number of preheat passageways in the series, which may be varied, and means are provided for interlocking the indexing arrangement with operation of the reciprocating tool holder to insure complete rotation of the tip blank to the drill position for each passageway of the series and for locking of the tip blank in the new position prior to initiating reciprocation of the tool holder for effecting the drilling of a passageway, as well as an arrangement for terminating operation of the machine after the last passageway of the series has been drilled.

As shown more clearly in Figs. 11 and 12, the indexing arrangement includes an annular rachet gear 200 surrounding the upper annular member 174 and supported on an outwardly extending horizontal shoulder 201 and secured thereto by means of studs 202. The studs 202 also secure to the annular member 174 a discsupply port 266, and output ports 267 and 268 connected to the conduits 68 and 69, respectively, feeding the cylinder 60. The casing 263 houses valve pistons 270 and 271 supported in spaced relation on a reciprocating valve rod 269. The rod 269 extends outwardly beyond the ends of the casing 263, and its upper end, as viewed in the drawing, passes through a solenoid coil 272 while its lower end passes through a solenoid coil 273. The valve pistons 270 and 271 are spaced on the rod 269 with respect to the exhaust, supply and output ports, so that fluid pressure from the conduit 288 is supplied to the conduit 69 and the conduit 68 is connected to the exhaust port 264 when the valve 260 is in a first position, and fluid pressure is conducted to the conduit 68 and the conduit 69 is connected to the exhaust port 265 when the valve is in a second position. The valve 260 is moved to either of its two positions upon energization of the solenoid coils 272 or 273. Energization of the solenoid coil 272 moves the valve into the second position in which the piston 62 is returned to the fully retracted position, while energization of the solenoid 273 moves the valve pistons and the valve rod downwardly to the positions shown, in which position fluid pressure is supplied to the conduit 69 for advancing the piston 62.

The pilot operated transfer valve 262 includes a casing 274 having exhaust ports 275 and 276, a supply port 277 and output ports 278 and 279. This transfer valve includes a valve rod 280 carrying spaced valve pistons 281 and 282. A pilot casing 283 extends from one end of the casing 274 and houses a pilot piston 284 connected to an extended end of the valve rod 280. A spring 285 is positioned in the pilot casing and acts on the pilot piston for normally urging the valve pistons 281 and 282 into the position shown in the drawing in which the output port 278 is connected to the supply port 277. The pilot casing includes an input port 286 positioned on the side of the pilot piston opposite the spring for the entry of fluid pressure to move the pilot piston downwardly and the valve pistons into their other position in which the output port 278 is connected to the exhaust port 275 and the supply port is connected to the output port 279. The supply port 277 is connected to the source of fluid pressure 261 through a conduit 287 shown in broken lines, and a conduit 288 connects the output port 278 of the valve 262 to the supply port 266 of the transfer valve 260.

When the piston 62 is retracted to the lowest point of its stroke, the cam 250 is adjusted to trip the switch 241. The switch 241 controls an energizing circuit for the solenoid 273, and when the switch 241 is closed by the cam 250 the solenoid is energized from a voltage source 289 through a circuit including a conductor 290, the switch 241, a conductor 291, a switch 292 of a relay 293 and a conductor 294. Energization of the solenoid 273 moves the valve 260 to its position shown in the drawing in which position fluid pressure is supplied to the cylinder 60 for advancing the piston 62. After initial upward movement of the piston 62, the cam 249 leaves contact with the follower of the switch 240 and trips the switch 240. Closing of the switch 240 connects the voltage source 289 to a timer 295 through the conductor 290 and conductors 296 and 297. The timer 295 may comprise any suitable device of conventional construction capable of delivering an output voltage after a predetermined interval of time following closing of the switch 240. A suitable device may comprise a timing motor driving a contact means. Closing of the switch 240 would initiate operation of the timing motor and the contact means would be operated a predetermined time interval following initiation of timing motor operation to connect the voltage source to an output conductor 298 of the timer. The output conductor is connected to the solenoid coil 272 through a conductor 299 so that the valve 260 is moved to its second position in which fluid pressure is supplied to the cylinder 60 to effect retraction of the piston 62 at a predetermined time interval following closing of the switch 241 as determined by the timer 295. The switch 241 returns to its normally opened position when its cam 250 moves upwardly past its follower so that the solenoid 273 is deenergized at the termination of the time interval when energizing the solenoid 272 occurs. As the piston 62 returns to its fully retracted position, the cam 249 moves the switch 240 into its open position and deenergizes the solenoid 272. When the piston 62 reaches its fully retracted position the switch 241 is tripped to again initiate the cycle of operation described above. The switch 242 is connected between the voltage source 289 and the conductor 299 and is operable upon contact with its cam 251 to effect energization of the solenoid 273 should the timer 295 fail to produce the output voltage at the proper time. The cam 251 is positioned on the rod 255 so that the switch 242 closes at the point of maximum permissible upward movement of the tool holder.

The cam 254 is adjusted relative to the switch 245 so that the switch 245 is closed upon contact between its follower and the cam 254 after the drill has advanced to a maximum position sufficient to drill a hole of the desired depth. When the switch 245 closes, a relay 300 is energized from a voltage source 301 through conductors 302 and 303, closing its switches 304 and 305. When the switch 304 closes a holding circuit for the relay 300 is completed through the switch 243 and conductors 306, 307 and 308. Closing of the switch 305 completes a circuit effecting energization of a solenoid coil 309 of a valve 310, the circuit including conductor 311, the switch 305, conductor 312, a normally closed switch 313 and a conductor 314. The valve 310 comprises a cylindrical casing 315 having a supply port 316, an exhaust port 317 and an output port 318. A valve piston 319 is positioned within the casing and is connected to a valve rod 320 extending from one end of the casing through the solenoid 309. A coil spring 321 positioned between the casing and the valve piston 319 urges the valve piston into the position shown in the drawing in which the output port 318 is connected to the exhaust port 317. The input port 316 is supplied with fluid pressure by way of the conduit 287 and the output port 318 is connected to a conduit 322 leading to the pilot input port 323 of a pilot operated valve 324. The valve 324 includes a cylindrical casing 325 having a supply port 326, an exhaust port 327 and an output port 328, and a pilot chamber 329. The casing 325 encloses a valve piston 330 connected to a valve rod 331 extending into the pilot chamber 329 and supporting a pilot piston 332. A pilot spring 333 urges the valve rod 331 upwardly, as viewed in the drawing, to normally position the valve piston 330 between the supply port 326 and the output port 328. The conduit 322 is provided with a one way check valve 334, and is connected to a conduit 335 including a metering valve 336 for purposes that will appear more fully hereinafter.

With the foregoing arrangement, when the solenoid 309 is energized upon closing of the relay 300, the valve piston 319 of the valve 310 moves upwardly, as viewed in the drawing, to form communication between the input and output ports and thus operate the pilot piston 332 of the valve 324. The valve piston 330 of the latter valve is thus moved downwardly, as viewed in the drawing, to conduct fluid pressure from the conduit 287 through the input port 326 to the output port 328 and to a conduit 337 connected thereto. The conduit 337 is connected to an input port 338 of a solenoid operated valve 339. The valve 339 is provided with a cylindrical casing 340 having the input port 338, an exhaust port 341 and an output port 342. This valve includes a valve piston 343 and a valve rod 344 extending outwardly from one end of the casing through a solenoid coil 345. A coil spring 346 is positioned in the casing 340 for urging the valve piston into the position shown in the drawing in which the output port 342 communicates with the exhaust port 341. The arrangement is such that upon energization of the solenoid 345, the valve rod 344 is moved upwardly, as viewed in the drawing, against the tension of the spring 346, to position the valve piston between the output port 342 and the exhaust port 341 and allow the flow of fluid pressure from the input port 338, that may be supplied thereto by way of the conduit 337, to the output port 342. The output port 342 is connected by way of a conduit 347 to the pilot input port 286 of the transfer valve 262. The tension of the spring 346 is such that the piston 343 does not move from the normal position shown in the absence of energization of the solenoid 345 even when fluid pressure is introduced into the chamber below the valve piston 343 upon operation of the valve 324.

Whenever the piston 62 returns to its fully retracted position the cam 252 actuates the switch 243. As described above, the switch 243 normally completes a holding circuit for the relay 300, however, when the switch is tripped by the cam 253, the holding circuit is opened and a circuit is completed for energizing the solenoid 345 of the valve 339. The energizing circuit for the solenoid 345 includes a conductor 348, the switch 343 and the conductor 306. Opening of the holding circuit for the relay 300 results in deenergization of the relay and opening of its switches 304 and 305, as the switch 245 returned to its open position after initial movement of the piston to its retracted position. Opening of the switch 304 prevents reenergization of the relay 300 upon the switch 243 returning to its normal position, while the switch 305 moving to its open position effects deenergization of the solenoid 309 of the valve 310. Upon deenergization of the solenoid 309, the coil spring 321 moves the valve piston 319 to its position shown, and connects the conduit 322 to the exhaust port 317. However, the check valve 334 prevents the flow of fluid pressure from the pilot chamber 329 and the valve 324 continues to supply fluid pressure to the conduit 337 for a predetermined period of time established by the adjustment of the metering valve 336 which controls the fluid pressure from the pilot chamber 329. The purpose of this time control arrangement of the operation of the valve 324 will appear more fully below.

When the solenoid 345 of the valve 339 is energized, the valve piston 343 moves upwardly, as viewed in the drawing, and fluid pressure is conducted to the conduit 347 and on to the pilot input port 286 of the transfer valve 262. As described above, application of fluid pressure on the pilot piston 284 of the latter valve moves the valve rod 280 and the valve pistons 281 and 282 against the tension of the pilot spring 285 to connect the conduit 288 to the exhaust port 275 and thus immobilize the cylinder 60, and also to establish communication between the supply port 277 and the output port 279. The switch 243 remains in the position to close the energizing circuit for the solenoid 345 until the cylinder 60 is supplied with fluid pressure to advance the piston 62. However, the transfer valve 262 is allowed to return to its normal position, as shown, in which fluid pressure is supplied to the transfer valve 260 even though the solenoid 345 remains energized. This is so since the valve 324 returns to its normal position when the fluid pressure on the pilot piston 332 bleeds through the metering valve 336, and exhausts the pilot 283 of the valve 262 through the conduit 347, the energized valve 339, the conduit 337 and the exhaust port 327.

The output port 279 of the transfer valve 262 is connected by way of a conduit 350 to a pilot input port 351 of a pilot operated transfer valve 352. The transfer valve 352 includes a cylindrical valve casing 353 and a pilot valve casing 354. The valve casing is provided with an input port 355 connected to the conduit 287, exhaust ports 356 and 357, and output ports 358 and 359 connected to the conduits 223 and 224, respectively. The transfer valve also includes a valve rod 360 carrying spaced valve pistons 361 and 362. The valve rod extends into the pilot casing and is connected to a pilot piston 363 therein. A pilot spring 364 urges the valve rod to position shown in the drawing in which the supply port 355 communicates with the output port 359, and in which the output port 358 communicates with the exhaust port 357. The exhaust port 357 is connected to a conduit 365 including a metering valve 366 for retarding the exhaust of fluid pressure from the port 357. When the pilot valve is operated by fluid pressure supplied by way of the conduit 350, the output port 359 is connected to the exhaust port 356 and fluid pressure is supplied to the conduit 223 by way of the output port 358.

Normally, the transfer valve 352 occupies the position shown in the drawing in which fluid pressure is supplied to the conduit 224 and the piston 367 of the cylinder 217 is moved for setting the indexing mechanism, that is, the rack 210 is moved into contact with the adjustable stop block 222. The conduit 224 is connected to a conduit 368 feeding fluid pressure to the index locking cylinder 230. Thus, normally, the piston 232 is urged against the tension of the spring 233 to move the locking pin 227 into one of the recesses 226 of the index locking plate 203. When the transfer valve 352 is moved to its other position, at which time the piston 62 is in its fully retracted position and the transfer valve 260 is immobilized, the cylinders 217 and 230 are connected to exhaust through the exhaust port 356 and fluid pressure is supplied to the cylinder 216. When the cylinder 230 is connected to exhaust, the spring 233 operates to move the locking pin 227 out of one of the recesses 226 to allow free rotation of the index locking plate 203, while the exhausting of the cylinder 217 allows free movement of the rack 210 responsively to the fluid pressure on the piston 369 to effect the actual indexing rotation of the tip blank. The metering valve 336 is adjusted so that sufficient fluid pressure is maintained on pilot piston 332 to hold the valve 324 in the position for supplying fluid pressure from its supply port 326 to its output port 328 for a period of time greater than the time required for the transfer valve 352 to move to its position for energizing the cylinder 216 and for completion of the actual indexing operation. Thus, the transfer valve 260 is not supplied with fluid pressure and movement of the piston 62 is not possible until after the indexing operation is complete. The metered exhaust from the cylinder 216 provides rapid energization of the cylinder 230 so that the index plate 203 is locked before the tool holder begins its first advance of the new series.

A conduit 370 is connected to the conduit 223 for conducting fluid pressure to the conduit 117 leading to the cylinder 112. Thus, when the actual indexing operation is taking place, the piston 78 is moved downwardly to its initial position and the hydraulic control device is conditioned for controlling another series of drilling cycles. The conduit 117 is also supplied with fluid pressure by way of a normally energized solenoid operated valve 371 and a conduit 372 including a one way check valve 373. The valve 371 is provided with a casing 374 having an exhaust port 375, an input port 376 connected to the conduit 287 and an output port 377 connected to the conduit 372. The casing encloses a slidably mounted valve piston 378 connected to a valve rod 379 extending outwardly from one end of the casing through a solenoid 380. A spring 381 is positioned in the casing to urge the valve piston into a position between the output and exhaust ports when the solenoid is unenergized, however, the solenoid is normally energized when power is supplied to the machine so that fluid pressure is supplied from the input port 376 to the output port 377. With this arrangement, when operation of the machine is terminated, such as when a drill breaks, the valve 374 is deenergized supplying fluid pressure to the cylinder 112 to insure the proper position of the piston rod 79 when the machine is again placed in operation.

Operation of the machine is initiated by pressing the starting button 385 to complete a circuit between the voltage source 301 and the relay 293, the circuit including a conductor 386, the starting button 385 and a conductor 387. Energization of the relay 293 closes its switches 292, 388 and 389. When the switch 388 closes, a circuit is completed between the drill rotating motor 28 and the voltage source 301 by way of conductors 390 and 391. Closing of the switch 389 completes a holding circuit for the relay 293 including conductor 392, stop button 393, conductor 394, normally closed switch 235, conductor 396, normally closed switch 397 and conductor 398 and also effects energization of the solenoid 380 through a circuit including a conductor 399. Since the switch 292 of the relay 293 is connected in series with the switch 241 controlling energization of the solenoid 273 of the transfer valve 260, advancement of the tool holder is prevented unless the motor 28 is supplied with current. This arrangement saves drill breakage which would occur upon advancing a non-rotating drill into the work.

When the last passageway of the series of preheat passageways is drilled, the machine is automatically stopped upon tripping the switch 235 by the cam 237 contacting the follower 236. Opening of the normally closed switch 235 deenergizes the relay 293 by opening its holding circuit. Deenergization of the relay 293 results in its switches 292, 388 and 389 moving to their open positions. This action prevents energization of the solenoid 273 which controls advancing of the tool holder, deenergizes the solenoid 380 which controls resetting of the piston 78 and terminates the supply of current to the motor 28. Of course, the foregoing may be accomplished during any phase of the operation of the machine by pressing the stop button 393 which also terminates the holding circuit for the relay 293.

As mentioned above, the present invention provides a torque control circuit operable in connection with the circuit described above in order to prevent breakage of drills due to abnormal chip clogging. As shown in Fig. 15, the torque control circuit includes a shunt 405 connected in the conductor 391 between the voltage source 301 and the motor 28. A potentiometer 406 is connected across the shunt 405 and to a relay 407 having a switch 408. The switch 408 is serially connected between the voltage source 289 and the conductor 299 by means of conductors 409 and 410. With this arrangement, should the motor 28 be excessively loaded due to chip clogging, an abnormal current flow will result in the motor feed circuit including the conductor 391, and the relay 407 will be energized through the potentiometer 406. Closing of the switch 408 connects the voltage source 289 to the solenoid 272 to energize this solenoid and effect retraction of the tool holder. The drill is thus removed from the workpiece and the chips cleaned therefrom in a manner described above.

As described above, in order to remove chips from the drill, to lubricate the drill and to cool the drill, the present invention provides an arrangement for directing a blast of fluid pressure, such as compressed air, onto the drill as the drill is being retracted, and for directing a blast of oily fluid pressure onto the drill when the drill is being advanced. The fluid pressure exhausted from the solenoid transfer valve 260 provides sources of fluid pressure properly synchronized with the tool holder for this purpose. As shown, the conduit 136 supplying fluid pressure to the passageway 134 for chip clearance is connected to the exhaust port 265 of the valve 260. With this arrangement fluid pressure is supplied to the conduit 136 upon downward movement of the piston 62 when the drill is being retracted. The exhaust port 264 receives fluid pressure from the cylinder 60 when the drill is being advanced and is connected to the conduit 138 for effecting lubrication of the drill. Thus, the solenoid operated transfer valve 260, in addition to the function of controlling energization of the cylinder 60, controls application of fluid pressure for chip clearance and application of fluid pressure carrying oil for lubrication of the drill.

As mentioned above, the control circuit provided by the present invention is adapted for controlling operation of the machine in such a manner so that the machine may be employed to drill the enlarged central passageway 148 in the tip blank. For this purpose a relay 415 including a normally closed switch 416 and a normally open switch 417 is provided. The relay 415 is enerergized from the source 301 through a circuit including the conductor 311, the switch 305 of the relay 300, the conductor 312, a conductor 418, a switch 419 normally closed for center hole drilling and a conductor 420. When the switch 417 is closed a circuit is completed between the voltage source 289 and the solenoid 272 for energizing this solenoid and retracting the tool holder. This circuit includes the conductor 290, a conductor 421, the switch 417 and a conductor 422 connected to the conductor 299. The normally closed switch 416 is connected by means of conductors 423 and 424 in parallel with the switch 244 connected in series with the holding circuit for the relay 293. A switch 425, normally closed for center hole drilling, is connected in the holding circuit by the relay 293 in series between the conductor 398 and one terminal of the switches 244 and 416 by means of a conductor 426.

When it is desired to adapt the machine for center hole drilling, the switches 313 and 397 are moved to open position and the switches 419 and 425 are moved to closed positions. When operation is initiated upon energizing the relay 293 by pushing the starting button 385, the solemnoids 273 and 272 are alternately energized cyclically under control of the timer 295 for reciprocating the tool holder in a manner similar to the operation when drilling the small diameter preheat passageways as described above. When the maximum advanced position of the drill is sufficient to complete the center hole, the switch 245 is tripped and the relay 300 closed. Closing of the relay switch 305 energizes the relay 415 through the switch 419 and opens the switch 416 and closes the switch 417. Closing of the switch 417 completes a circuit between the solenoid 272 and voltage source 289 and effects downward movement of the tool holder to its fully retracted position, while opening of the switch 416 opens the holding circuit of the relay 293 and stops the machine. However, when the tool holder reaches its fully retracted position, the switch 243 is tripped to open the holding circuit for the relay 300 and thus effect deenergization of the relay 415. This action completes the holding circuit for the relay 293 to condition the machine for further operation upon pushing the starting button 395. The switch 244 is set to be actuated by its cam 253 at the highest permissible advance position of the tool holder and thus insure retraction of the tool holder in the event of a malfunction in the circuit.

When it is desired to drill a series of small diameter preheat passageways in a tip blank of the type shown in Figs. 9 and 10, the tip blank is placed in the chuck 186, the cradle is rotatably positioned with respect to the base plate 150 upon operation of the hand wheel 163, and the base plate 150 is laterally positioned with respect to the vertical longitudinal axis of the drill upon operation of the handwheel 166, to position the tip blank in the manner shown in Fig. 12 in which the longitudinal axis of the drill 28 is parallel to the tapered portion of the tip blank and is displaced from the center of the tip blank an amount equal to the radius of the circular locus of the series of preheat passageways. The stop block 222 of the indexing mechanism is adjusted in accordance with the number of preheat passageways in the series, and an index lock plate 203 having a corresponding number of recesses is provided. The starting button 385 may then be pushed to initiate operation of the machine. The motor 28 is energized to rotate the spindle and drill at the desired speed for the particular drilling operation, and the tool holder begins to cyclically advance and retard under control of the timer 295, with the constant advance intervals being automatically divided into a rapid transverse period and a relatively slow feed period with the feed period progressively decreasing in duration as the depth of the hole increases automatically upon operation of the hydraulic control device including the piston 78 and its piston rod 79. After the drill is advanced a sufficient distance to drill the first preheat passageway, the tool holder is returned to its fully retracted position and immobilized in that position upon operation of the valves 310, 324, 339 and 262, the latter valve terminating the supply of fluid pressure to the transfer valve 260 and supplying fluid pressure to the indexing transfer valve 352 by way of the conduit 350. The transfer valve 352 operates in response to this fluid pressure to supply fluid pressure to the cylinder 216 and effect movement of the rack 210 to rotate the tip blank to a new position in which the longitudinal axis for the next preheat passageway of the series is coincident with the longitudinal axis of the drill 27. While the indexing operation takes place, the cylinder 112 is supplied with fluid pressure to reset the hydraulic control device, by moving the piston rod 79 and the piston 78 downwardly to their lowermost position, so that the device may control another series of cyclical advance intervals of the tool holder. After the indexing operation is complete and the hydraulic control device reset, the transfer valve 262 returns to its normal position as shown in the drawing in which fluid pressure is supplied to the transfer valve 260 and the tool holder commences to cyclically advance and retard under the control of the timer 295. This cycle of operation continues for the drilling of each preheat passageway of the series. Following the drilling of the last preheat passageway of the series, the tool holder will be retracted to its fully retracted position and immobilized in that position and the indexing cylinder will be energized to rotate the drilled tip the predetermined number of indexing degrees. However, during this indexing of the tip, the cam 237 actuates the switch 235 which opens the holding circuit for the relay 293 and stops the machine. This indexing operation will be completed and the transfer valve 262 will return to its position for supplying fluid pressure to the transfer valve 260 independently of deenergization of the relay 293 to condition the machine for automatically drilling a series of preheat passageways in another tip blank by merely removing the drilled tip blank from the chuck, inserting an undrilled tip blank in the chuck and pressing the starting button 385. Should the timer 295 fail to operate at any time during the cycle, the switch 242 energizes the solenoid 272 to return the tool holder to its fully retracted position. Also, the tool holder is automatically retracted should the drill become abnormally clogged with chips through operation of the torque control circuit. For center hole drilling, the tip blank is positioned with its longitudinal axis in concentric relation with the longitudinal axis of the drill 27 as shown in Fig. 13, and the switches 419 and 425 are closed while the switches 313 and 397 are moved to open position. The machine operates in a manner similar to its operation when drilling the preheat passageways but without the indexing and with the machine being stopped automatically after the center hole is drilled.

There is thus provided by the present invention a novel drilling machine particularly of the high speed type adapted for employing small diameter drills of relatively long length. The machine includes a step drilling cycle in which the drill is repeatedly retracted from the work and then refed into the work to provide for chip clearance, cooling of the drill and lubrication of the drill. The step drilling cycle is obtained from a novel arrangement of relatively simple construction, as compared to prior art devices, and includes provisions of automatically establishing high speed traverse of the tool holder when it is being moved relative to the workpiece and a relatively slow feeding speed when the actual drilling operation is taking place. The reciprocating tool holder is cyclically advanced in fixed intervals divided into a portion during which the tool holder is being advanced toward the work and a portion during which the actual drilling operation takes place, and a means is provided for progressively decreasing the latter portion as the depth of the drilled hole increases. The present invention also provides a novel supporting structure for use with small diameter, long length drills including a pair of spaced bushing members which function to support the drill and prevent the transmission of flexing forces along the length of the drill, as well as providing an arrangement for chip removal, drill lubrication and drill cooling synchronized with reciprocation of the tool holder. Moreover, the present invention provides a novel arrangement for supporting a workpiece with respect to the drill and an indexing arrangement together with a control circuit so that a series of holes, such as the preheat passageways in a blank for a cutting tip may be drilled automatically with only one setting of the machine and arranged in such a manner so that the machine may be easily adjusted for single hole drilling operation.

Although only one embodiment of the invention has been disclosed and described herein, it is expressly understood that various changes and substitutions may be made without departing from the spirit of the invention as well understood by those skilled in the art. Reference therefore will be had to the appended claims for a definition of the limits of the invention.

What is claimed is:

1. In an automatic drilling apparatus, a tool holder, a fluid pressure actuated driving piston movable in a cylinder and operatively connected with the tool holder for advancing the tool holder from a fully retracted position toward an advanced position upon fluid pressure energization of the cylinder on one side of the piston and for retracting the tool holder from an advanced position to the fully retracted position upon fluid energization of the cylinder on the other side of the piston, a transfer valve movable between two positions for controlling the supply of fluid pressure to the cylinder alternately on the opposite sides of the piston, means operable responsively to the position of the tool holder in its fully retracted position for moving the transfer valve to one of the two positions in which fluid pressure is supplied to the one side of the piston for advancing the tool holder toward an advanced position, control means for effecting movement of the tool holder at high speed during the first portion of its movement to an advanced position and for effecting movement of the tool holder at a relatively low speed during the remaining portion of its movement to an advanced position, a timing device for producing a control signal a predetermined time interval following initiation of its operation, means operative responsively to initial movement of the tool holder from the fully retracted position to initiate operation of the timing device, and means operative responsively to the control signal produced by the timing device for moving the transfer valve to the other of the two positions in which fluid pressure is applied to the other side of the piston for retracting the tool holder to the fully retracted position, the last-named means being operative independently of the control means.

2. In an automatic drilling apparatus, a tool holder, a fluid pressure actuated driving piston movable in a cylinder and operatively connected with the tool holder for advancing the tool holder from a fully retracted position toward an advanced position upon fluid pressure energization of the cylinder on one side of the piston and for retracting the tool holder from an advanced position to the fully retracted position upon fluid energization of the cylinder on the other side of the piston, a two-position solenoid-operated transfer valve movable between two positions and operable in one position to supply fluid pressure to the cylinder on one side of the piston and operable in the other position for supplying fluid pressure to the cylinder on the other side of the piston, means operable responsively to the position of the tool holder in its fully retracted position for energizing the solenoid-operated transfer valve and moving the transfer valve to the one position, control means for effecting movement of the tool holder at high speed during the first portion of its movement to an advanced position and for effecting movement of the tool holder at a relatively slow speed during the remaining portion of its movement to an advanced position, a timing device for producing a control signal a predetermined time interval following initiation of its operation, means operative responsively to initial movement of the tool holder from the fully retracted position to initiate operation of the timing device, and means operative responsively to the control signal produced by the timing device for energizing the solenoid-operated transfer valve to move the transfer valve to the other position, the last-named means being operative independently of the control means.

3. In an automatic drilling machine having a frame, a tool holder mounted for reciprocating movement in the frame, a fluid pressure actuated driving piston movable in a cylinder and operatively connected with the tool holder for advancing the tool holder from a fully retracted position toward an advance position upon fluid energization of the cylinder on one side of the piston and for retracting the tool holder from an advance position to the fully retracted position upon fluid energization of the cylinder at the other end on the other side of the piston, a two-position solenoid-operated transfer valve operable in one position to supply fluid pressure to the cylinder on one side of the piston and operable in the other position to supply fluid pressure to the cylinder on the other side of the piston, first switch means operative responsively to the tool holder in its fully retracted position for effecting energization of the two-position solenoid-operated transfer valve to move the transfer valve to the one position, control means for effecting movement of the tool holder at high speed during the first portion of its movement to an advanced position and for effecting movement of the tool holder at a relatively low speed during the remaining portion of its movement to an advanced position, a timing device for producing a control signal a predetermined time interval following initiation of its operation, switch means operable responsively to initial movement of the tool holder from its fully retracted position to initiate operation of the timing device, means for feeding the control signal to the two-position solenoid-operated transfer valve to move the transfer valve to the other position, the last-named means being operable independently of the control means.

4. In an automatic drilling machine employing elongated drills of relatively small diameter, a frame, a tool holder mounted on the frame for sliding movement relative to the frame, a fluid pressure actuated piston movable in a cylinder and operatively connected with the tool holder for advancing the tool holder relative to the frame from a fully retracted position upon fluid energization of the cylinder on one side of the piston and exhausting fluid pressure from the other side of the piston and for retracting the tool holder relative to the frame from an advanced position to the fully retracted position upon fluid energization of the cylinder on the other side of the piston and exhausting fluid pressure from the one side of the piston, a support for the drill, the support including a pair of spaced bushings each having a bore of a diameter corresponding to the diameter of the drill, means mounting the drill support on the frame relative to the tool holder with the longitudinal axes of the bores parallel to and concentric with the longitudinal axis of the drill and with the drill extending into one of the bores when the tool holder is in the fully retracted position and extending past the space between the bushings and into the other bore when the tool holder is in the advanced position, a pair of ports communicating with the space between the bushings, means conducting fluid under pressure exhausted from one side of the piston to the one port and means conducting fluid under pressure exhausted from the other side of the piston to the other port.

5. An automatic drilling machine of the character defined in claim 4 in which means are provided for adding a lubricating material to the stream of fluid under pressure exhausted from the other side of the piston.

6. In an automatic drilling machine employing elongated drills of relatively small diameter, a frame, a tool holder slidably mounted on the frame, a fluid pressure actuating piston movable in a cylinder and operatively connected with the tool holder for advancing the tool holder relative to the frame from a fully retracted position upon fluid energization of the cylinder on one side of the piston and exhausting fluid pressure from the other side of the piston and for retracting the tool holder relative to the frame from an advanced position to the fully retracted position upon fluid energization of the cylinder on the other side of the piston and exhausting fluid pressure from the one side of the piston, a two-position solenoid-operated transfer valve operable in one position to supply fluid pressure to one side of the piston and for exhausting fluid pressure from the other side of the piston and operable in the other position for supplying fluid pressure to the other side of the piston and for exhausting fluid pressure from the one side of the piston, switch means operable responsively to the tool holder in its fully retracted position for controlling energization of the solenoid-operated transfer valve to move the transfer valve to its one position, a timing device for controlling energization of the transfer valve to move the transfer valve to its other position, means responsive to advance movement of the tool holder from its fully retracted position to initiate operation of the timing device, a support for the drill, the drill support including a pair of spaced bushings each having a bore of a diameter corresponding to the diameter of the drill, means mounting the drill support on the frame relative to the tool holder with the longitudinal axes of the bores parallel to and concentric with the longitudinal axis of the drill and with the drill extending into the bore of one of the bushings when the tool holder is in its fully retracted position and extending through the space between the bushings and into the bore of the other bushing when the drill holder is in an advanced position, a pair of ports communicating with the space between the bushings, conduit means for conducting fluid under pressure exhausted from the one side of the piston to one of the ports, conduit means conducting fluid under pressure exhausted from the other side of piston to the other port, and means for introducing a lubricating material into the fluid under pressure exhaust in the latter conduit means.

7. In an automatic drilling machine employing elongated drills of small diameter, a frame, a tool holder mounted on the frame for sliding movement relative to the frame, a fluid pressure actuated piston movable in a cylinder and operatively connected with the tool holder for advancing the tool holder relative to the frame from a fully retracted position upon fluid energization of the cylinder on one side of the piston and exhausting fluid pressure from the other side of the piston and for retracting the tool holder relative to the frame from an advanced position to the fully retracted position upon fluid energization of the cylinder on the other side of the piston and exhausting fluid pressure from the one side of the piston, a support for the drill, the drill support including a pair of spaced bushings each having a bore of a diameter corresponding to the diameter of the drill, means mounting the drill support on the frame relative to the tool holder with the longitudinal axes of the bores parallel to and concentric with the longitudinal axis of the drill and with the drill extending into the bore of one of the bushings when the tool holder is in its fully retracted position and extending through the space between the bushings and into the bore of the other bushing when the tool holder is in an advanced position, a pair of ports in the drill support communicating with the space between the bushings, conduit means for conducting fluid under pressure to one of the ports when the drill is moved toward its fully retracted position for removing chips from the drill, conduit means for supplying fluid under pressure containing a lubricating material to the other port when the drill is advanced from its fully retracted position for lubricating the drill, and a control valve for synchronously applying fluid under pressure alternately to one end of the piston and one of the conduit means and to the other end of the piston and to the other conduit means.

8. In a step drilling machine, a tool holder, means for cyclically imparting advancing movement to the tool holder for advancing the tool holder from a fully retraced position toward a fully advanced position and for imparting retracting movement to the tool holder for retracting the tool holder from an advanced position to the fully retracted position, means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder and a unilateral restriction communicating with opposite sides of the piston for restricting movement of the piston in one direction relative to the cylinder and providing substantially unrestricted movement of the piston in the other direction, means forming a connection between the tool holder and the piston operable for moving the piston in the one direction relative to the cylinder in synchronism with the tool holder upon advancing movement of the tool holder and for moving the tool holder independently of the piston upon retracting movement of the tool holder, and means for moving the piston in the other direction relative to the cylinder.

9. In a step drilling machine, a tool holder, means for cyclically imparting advancing movement to the tool holder for advancing the tool holder from a fully retracted position toward a fully advanced position and for imparting retracting movement to the tool holder for retracting the tool holder from an advanced position to the fully retracted position, means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder and a unilateral restriction communicating with opposite sides of the piston for restricting movement of the piston in one direction relative to the cylinder and a by-pass means providing substantially unrestricted movement of the piston in the other direction, means forming a connection between the tool holder and the piston operable for moving the piston in the one direction relative to the cylinder in synchronism with the tool holder upon advancing movement of the tool holder and for moving the tool holder independently of the piston upon retracting movement of the tool holder, and means for moving the piston in the other direction relative to the cylinder.

10. In a step drilling machine, a tool holder, means for cyclically imparting advancing movement to the tool holder for advancing the tool holder from a fully retracted position toward a fully advanced position and for imparting retracting movement to the tool holder for retracting the tool holder from an advanced position to the fully retracted position, means to retard the rate of the advancing movement of the tool holder at successively advanced positions of the tool holder with respect to the fully advanced position upon each cyclical advance of the tool holder from the fully retracted position, the last-named means comprising a closed hydraulic circuit including a piston slidably mounted in a cylinder, a unilateral restriction communicating with opposite sides of the piston for restricting movement of the piston in one direction relative to the cylinder, by-pass means providing substantially unrestricted movement of the piston in the other direction, a piston rod connected to the piston, stop means on the piston rod, bracket means carried by the tool holder and adapted to contact the stop means only upon advancing movement of the tool holder, and means for moving the tool holder in the other direction relative to the cylinder.

11. In a step drilling machine, a tool holder, means for cyclically imparting advancing movement to the tool holder for advancing the tool holder from a fully retracted position toward a fully advanced position and for imparting retracting movement to the tool holder for retracting the tool holder from an advanced position to the fully retracted position, means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder, a unilateral restriction communicating with opposite sides of the piston for restricting movement of the piston in one direction relative to the cylinder, by-pass means providing substantially unrestricted movement of the piston in the other direction, a piston rod connected to the piston, adjustable stop means on the piston rod, bracket means carried by the tool holder and adapted to contact the stop means only upon advancing movement of the tool holder, and means for moving the piston in the other direction relative to the cylinder.

12. In a step drilling machine, a tool holder, means for cyclically imparting advancing movement to the tool holder for advancing the tool holder from a fully retracted position toward a fully advanced position and for imparting retracting movement to the tool holder for retracting the tool holder from an advanced position to the fully retracted position, means to retard the rate of the advanced movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder, a unilateral restriction communicating with opposite sides of the piston for restricting movement of the piston in one direction relative to the cylinder, by-pass means providing substantially unrestricted movement of the piston in the other direction, a piston rod connected to the piston, adjustable stop means on the piston rod, bracket means carried by the tool holder and adapted to contact the adjustable stop means only upon advancing movement of the tool holder for moving the piston with the tool holder upon advancing movement of the tool holder, and fluid pressure actuated means connected to the piston rod for moving the piston in the other direction.

13. In a step drilling machine, a frame, a tool holder slidably mounted on the frame, means for cyclically imparting advancing movement to the tool holder for advancing the tool holder from a fully retracted position toward a fully advanced position and for imparting retracting movement to the tool holder for retracting the tool holder from an advanced position to the fully retracted position, means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder, a unilateral restriction communicating wtih opposite sides of the piston for restricting movement of the piston in one direction relative to the cylinder, by-pass means providing substantially restricted movement of the piston in the other direction, a piston rod connected to the piston, means mounting the cylinder on the frame with the longitudinal axis of the piston rod parallel with the direction of sliding movement of the tool holder and with the one direction of movement of the piston corresponding to the direction of the advancing movement of the tool holder, adjustable stop means on the piston rod, bracket means carried by the tool holder for contacting the adjustable stop means only upon advancing movement of the tool holder, and a fluid actuated piston secured to the piston rod for moving the piston in the other direction.

14. In an automatic drilling apparatus, a tool holder, a fluid pressure actuating driving piston movable in a cylinder and operatively connected with the tool holder to impart advancing movement to the tool holder for advancing the tool holder from a fully retracted position toward an advanced position upon fluid energization of the cylinder on one side of the piston and for imparting retracting movement to the tool holder for retracting the tool holder from an advanced position to the fully retracted position upon fluid energization of the cylinder on the other side of the piston, means for cyclically energizing the cylinder on opposite sides of the driving piston, means to retard the rate of advancing movement of the piston upon each cyclical advance of the tool holder from the fully retracted position, the last-named means comprising a closed hydraulic circuit including a hydraulic cylinder, a hydraulic piston slidably mounted in the cylinder, a unilateral restriction communicating with the hydraulic cylinder on opposite sides of the hydraulic piston for restricting movement of the hydraulic piston in one direction relative to the hydraulic cylinder, by-pass means providing substantially unrestricted movement of the hydraulic piston in the other direction, a piston rod connected to the hydraulic piston, adjustable stop means on the piston rod, bracket means carried by the tool holder and adapted to contact the adjustable stop means only upon advancing movement of the tool holder, and fluid pressure actuated means for moving the hydraulic piston in the other direction relative to the hydraulic cylinder.

15. In an automatic drilling apparatus, a frame, a tool holder slidably supported on the frame, a fluid pressure actuating driving piston movable in a cylinder supported on the frame and operatively connected with the tool holder for imparting advancing movement to the tool holder for advancing the tool holder from a fully retracted position toward an advanced position upon fluid energization of the cylinder on one side of the piston and for imparting retracting movement to the tool holder for retracting the tool holder from an advanced position to the fully retracted position upon fluid energization of the cylinder on the other side of the piston, a two-position transfer valve operable in one position for supplying fluid pressure to the cylinder on one side of the piston and operable in the other position for supplying fluid pressure to the cylinder on the other side of the piston, means operable responsively to the position of the tool holder in its fully retracted position for moving the transfer valve to its one position, a timing device for moving the transfer valve to its other position, means responsive to movement of the tool holder from the fully retracted position to initiate operation of the timing device, means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a hydraulic piston slidably mounted in a hydraulic cylinder, a unilateral retriction communicating with opposite sides of the hydraulic piston for restricting movement of the hydraulic piston in one direction relative to the hydraulic cylinder, by-pass means providing substantial unrestricted movement of the hydraulic piston in the other direction, a piston rod connected to the hydraulic piston, means for mounting the hydraulic cylinder on the frame with the longitudinal axis of the piston rod parallel to the line of movement of the tool holder and with the direction of movement of the piston rod in the one direction corresponding to the direction of the advancing movement of the tool holder, adjustable stop means carried by the piston rod, bracket means carried by the tool holder adapted to contact the adjustable stop means only upon advancing movement of the tool holder, and a fluid pressure actuated piston connected to the piston rod and slidably mounted in a cylinder for moving the hydraulic piston in the other direction relative to the hydraulic cylinder.

16. In an automatic drilling apparatus, a frame, a drill holder slidably mounted on the frame, a fluid pressure actuated driving piston movable in a cylinder and operatively connected with the drill holder for advancing the drill holder from a fully retracted position upon fluid energization of the cylinder on one side of the piston and for retracting the drill holder from an advanced position to the fully retracted position upon fluid energization of the cylinder on the other side of the piston, a first two-position transfer valve operable in one position for supplying fluid pressure to the cylinder on one side of the piston and operable in the other position to supply fluid pressure to the cylinder on the other side of the piston, a workpiece supporting table rotatably mounted on the frame, an indexing mechanism for rotating the supporting table to position the workpiece at different predetermined positions relative to the path of advance movement of the drill, fluid pressure actuated power means for operating the indexing mechanism, a second two-position transfer valve operable in one position for effecting the supply of fluid pressure to the first transfer valve and operable in the other position for terminating the supply of fluid pressure to the first transfer valve and for effecting the supply of fluid pressure to the fluid pressure actuated power means, and means for operating the second transfer valve responsively to a predetermined position of the drill holder relative to the frame.

17. An automatic drilling apparatus as defined in claim 16 including means for normally maintaining the second transfer valve in the one position for effecting the supply of fluid pressure to the first transfer valve, switch means operative responsively to a predetermined advanced position of the tool holder corresponding to a desired depth of hole to be drilled for producing an output signal, and means responsive to the output signal for moving the second transfer valve from its normal one position to its second position and thereby terminate the supply of fluid under pressure to the first transfer valve and apply fluid under pressure to the fluid actuated power means of the indexing mechanism.

18. In an automatic drilling apparatus, a frame, a drill holder slidably mounted on the frame, a fluid actuated driving piston movable in a cylinder and operatively connected with the drill holder for advancing the drill holder from a fully retracted position upon fluid energization of the cylinder on one side of the piston and for retracting the drill holder from the advanced position to the fully retracted position upon fluid energization of the cylinder on the other side of the piston, a first two-position transfer valve operable in one position for supplying fluid pressure to the cylinder on one side of the piston and operable in the other position to supply fluid pressure to the cylinder on the other side of the piston, a workpiece supporting table rotatably mounted on the frame, an indexing mechanism for rotating the table to locate the workpiece at different predetermined positions relative to the path of advance movement of the drill, the indexing mechanism including slidably mounted rack means movable upon energization of a fluid pressure actuated power cylinder and connected to the workpiece supporting table through gear means so that the workpiece supporting table is rotated a predetermined number of degrees upon each energization of the power cylinder; a second two-position transfer valve operable in one position for effecting the supply of fluid pressure to the first transfer valve and operable in the other position for terminating the supply of fluid pressure to the first transfer valve and for supplying fluid pressure to the power cylinder of the indexing mechanism, means responsive to a predetermined advance position of the drill holder and subsequent return of the drill holder to its fully retracted position for moving the second transfer valve to the other position, means for returning the second transfer valve to its one position, and means operable after the second transfer valve is moved to its one position for returning the rack means of the indexing mechanism to its normal position.

19. In an automatic drilling apparatus, a frame, a drill holder slidably mounted on the frame, a fluid pressure actuated driving piston movable in a cylinder and operatively connected with the drill holder for advancing the drill holder from a fully retracted position upon fluid energization of the cylinder on one side of the piston and for retracting the drill holder from an advance position to the fully retracted position upon fluid energization of the cylinder on the other side of the piston, a first two-position transfer valve operable in one position for supplying fluid pressure to the cylinder on one side of the piston and operable in the other position for supplying fluid pressure to the cylinder on the other side of the piston, a workpiece supporting table rotatably mounted on the frame, an indexing mechanism for rotating the table to position the workpiece at different predetermined positions relative to the path of advanced movement of the drill, fluid pressure actuated power means for controlling the indexing mechanism, a second two-position transfer valve operable in one position for effecting the supply of fluid pressure to the first transfer valve and operable in the other position for effecting the supply of fluid pressure to the fluid pressure actuated power means of the indexing mechanism, means operable in response to a predetermined advanced position of the drill holder and subsequent return of the drill holder to its fully retracted position for actuating the second transfer valve and moving the second transfer valve to the other position to terminate the supply of fluid pressure to the first transfer valve and to effect the supply of fluid pressure to the fluid pressure actuated power means of the indexing mechanism, and means operable after a predetermined period of time following operation of the last-named means for moving the second transfer valve to its one position.

20. In an automatic drilling apparatus, a frame, a drill holder slidably mounted on the frame, a fluid pressure actuated driving piston movable in a cylinder and operatively connected with the tool holder for advancing the tool holder from a fully retracted position upon fluid energization of the cylinder on one side of the piston and for retracting the drill holder from an advanced position to the fully retracted position upon fluid energization of the cylinder on the other side of the piston, a first two-position transfer valve operable in one position for supplying fluid pressure to the cylinder on one side of the piston and operable in the other position to supply fluid pressure to the cylinder on the other side of the piston, a workpiece supporting table rotatably mounted on the frame, an indexing mechanism for rotating the table to position the workpiece at different predetermined positions relative to the path of advance movement of the drill, a fluid pressure actuated power means for operating the indexing mechanism, a second two-position transfer valve operable in one position for effecting the supply of fluid pressure to the first transfer valve and operable in the other position for terminating the supply of fluid pressure to the first transfer valve and for effecting the supply of fluid pressure to the fluid pressure actuated power means of the indexing mechanism, means including a first switch means operable in response to a predetermined advanced position of the tool holder and a second switch means operative upon subsequent return of the drill holder to its fully retracted position for effecting movement of the second transfer valve to its other position, and means operable after a predetermined time interval following for returning the second transfer valve to its one position.

21. In an automtaic drilling apparatus, a frame, a drill holder slidably mounted on the frame, a fluid pressure actuated driving piston movable in a cylinder and operatively connected with the drill holder for advancing the drill holder from a fully retracted position upon fluid energization of the cylinder on one side of the piston and for retracting the drill holder from an advanced position to the fully retracted position upon fluid energization of the cylinder on the other side of the piston, a two-position transfer valve operable in one position to supply fluid pressure to the cylinder on one side of the piston and operable in the other position to supply fluid pressure to the cylinder on the other side of the piston, a work supporting table rotatably mounted on the frame to position the workpiece at different predetermined positions relative to the path of advanced movement of the drill, slidably mounted rack means connected to the supporting table through gear means for rotating the supporting table a predetermined number of degrees upon movement of the rack means in one direction, first fluid pressure actuated power means for moving the rack means in the one direction, second fluid pressure actuated power means for moving the rack means in the other direction, a second two-position transfer valve operable in one position for supplying fluid pressure to the first fluid pressure actuated power means while exhausting the second fluid pressure actuated power means and operable in the other position for exhausting the first fluid pressure actuated power means and for supplying fluid pressure to the second fluid pressure actuated power means, a third two-position transfer valve operable in one position for supplying fluid pressure to the first transfer valve and operable in the other position for terminating the supply of fluid pressure to the first transfer valve and for supplying fluid pressure to the second transfer valve, means including first switch means operable in response to movement of the drill holder to a predetermined advanced position and second switch means operable upon the drill holder returning to its fully retracted position following operation of the first switch means for effecting movement of the third transfer valve to its other position, means operable after a predetermined time interval following operation of the first switch means for moving the third transfer valve to move to its one position.

22. In an automatic drilling apparatus as defined in claim 21, in which the rack means is moved in the one direction during the predetermined time interval and in which means are provided for locking the workpiece upon movement of the second transfer valve to its one position.

23. In an automatic drilling machine as defined in claim 21, means to retard the rate of the advance movement of the drill holder at successively advanced positions of the drill holder with respect to the fully retracted position upon each cyclical advance of the drill holder from the fully retracted position, and means operable upon movement of the second transfer valve to its other position for returning the foregoing means to its normal position for retarding the rate of advanced movement of the drill holder during another series of cyclical advances of the drill holder.

24. In an automatic drilling machine of the character defined in claim 21, means to retard the rate of the advance movement of the drill holder at successively advanced positions of the drill holder with respect to the fully retracted position upon each cyclical advance of the drill holder from the fully retracted position, which means comprises a closed hydraulic circuit including a piston slidably mounted in a cylinder and a unilateral restriction communicating with opposite sides of the piston for restricting movement of the piston in one direction relative to the cylinder and providing substantially unrestricted movement of the piston in the other direction, and a connection between the drill holder and the piston for moving the piston in the one direction with the tool holder upon advance movement of the tool holder and for moving the tool holder independently of the piston upon retracting movement of the tool holder, and means operable upon movement of the second transfer valve to its one position for moving the piston in the other direction to its normal position for retarding the rate of advance movement of the tool holder during another series of cyclical advances of the tool holder.

25. An automatic drilling machine as defined in claim 21, in which the third transfer valve is biased normally in its one position and is movable to its other position upon operation of a fluid pressure operated pilot valve energized with fluid pressure through serially connected first and second valve means respectively moved to their operable positions in response to the tool holder advancing to a predetermined advance position and upon subsequent return of the tool holder to its fully retracted position, and means operable after the predetermined time interval for deenergizing the pilot valve with the second valve means in the operable position.

26. In an apparatus for drilling a series of preheat passageways in a tip blank, the tip blank including a tapered portion extending toward the flame end of the tip, a rotatable spindle adapted to carry an elongated small diameter drill, chuck means for releasably supporting the tip blank with its flared end facing the drill, supporting means for the chuck means, means for pivotally supporting the chuck supporting means to position the surface of the tapered portion of the tip blank parallel to the longitudinal axis of the spindle, means for mounting the chuck supporting means for lateral movement relative to the longitudinal axis of the spindle, to position the tip blank relative to the longitudinal axis of the spindle so that the longitudinal axis of the drill passes through the tip blank in spaced relation with the longitudinal axis of the tip blank, means for mounting the chuck supporting means for rotation about the longitudinal axis of the tip blank, and means including an indexing mechanism for positioning the chuck supporting means at predetermined angular positions with respect to the longitudinal axis of the drill.

27. In an automatic drilling apparatus, a tool holder, a fluid pressure actuated driving piston movable in a cylinder and operatively connected with the tool holder for advancing the tool holder from a fully retracted position toward an advance position upon fluid pressure energization of the cylinder on one side of the piston and for retracting the tool holder from an advance position to the fully retracted position upon fluid energization of the cylinder on the other side of the piston, a transfer valve movable between two positions for controlling the supply of fluid pressure to the cylinder alternately on opposite sides of the piston, means operative responsively to the position of the tool holder in its fully retracted position for moving the transfer valve to one of the two positions in which fluid pressure is supplied to the one side of the piston for advancing the tool holder toward an advance position, a timing device for producing a control signal a predetermined time interval following initiation of its operation, means operative responsively to initial movement of the tool holder from its fully retracted position to initiate operation of the timing device, means operative responsively to the control signal produced by the timing device for moving the transfer valve to the other of the two positions in which fluid pressure is supplied to the other side of the piston for retracting the tool holder to the fully retracted position, and means for retarding the rate of the advancing movement of the tool holder at successively advanced positions of the tool holder with respect to the fully retracted position upon each cyclical advance of the tool holder from the fully retracted position.

28. In an automatic drilling apparatus, a tool holder, a fluid pressure actuated driving piston movable in a cylinder and operatively connected with the tool holder for advancing the tool holder from a fully retracted position toward an advance position upon fluid pressure energization of the cylinder on one side of the piston and for retracting the tool holder from an advance position to the fully retracted position upon fluid energization of the cylinder on the other side of the piston, a two-position solenoid-operated transfer valve movable between two positions and operable in one position for supplying fluid pressure to the cylinder on one side of the piston and operable in the other position for supplying fluid pressure to the cylinder on the other side of the piston, means operable responsively to the position of the tool holder in its fully retracted position for energizing the solenoid-operated transfer valve and moving the transfer valve to the one position, a timing device for energizing the solenoid-operated transfer valve to move the transfer valve to the other position, means operable responsively to movement of the tool holder from its fully retracted position to initiate operation of the timing device, the timing device being operative to effect movement of the transfer valve to the other position at a predetermined time interval following initiation of its operation, and means to retard the rate of the advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder and a unilateral restriction communicating with opposite sides of the piston for restricting movement of the piston in one direction relative to the cylinder and providing substantially unrestricted movement of the piston in the other direction, a connection between the tool holder and the piston for moving the piston with the tool holder in the one direction relative to the cylinder upon advancing movement of the tool holder and for moving the tool holder independently of the piston upon retracting movement of the tool holder, and means for moving the piston in the other direction relative to the cylinder.

29. In an automatic drilling machine having a frame, a tool holder mounted for reciprocating movement in the frame, a fluid pressure actuated driving piston movable in a cylinder and operatively connected with the tool holder for advancing the tool holder from a fully retracted position toward an advance position upon fluid energization of the cylinder on one side of the piston and for retracting the tool holder from an advance position to the fully retracted position upon fluid energization of the cylinder on the other side of the piston, a two-position solenoid-operated transfer valve operable in one position to supply fluid pressure to the cylinder on one side of the piston and operable from the other position to supply fluid pressure to the cylinder on the other side of the piston, first switch means operable responsively to the tool holder in its fully retracted position for effecting energization of the two-position solenoid-operated transfer valve to move the transfer valve to the one position, a timing device connected to the two-position solenoid-operated transfer valve for producing an output signal and energizing the transfer valve to move the transfer valve to the other position, switch means responsive to movement of the tool holder from its fully retracted position to initiate operation of the timing device, the timing device being operable to produce an output signal at a predetermined time interval following initiation of its operation, and means to retard the rate of advancing movement of the tool holder at successively advanced positions of the tool holder with respect to the fully retracted position upon each cyclical advance of the tool holder from the fully retracted position, the last-named means comprising a closed hydraulic circuit including a piston slidably mounted in a cylinder and a unilateral restriction communicating with opposite sides of the piston for restricting movement of the piston in one direction relative to the cylinder and by-pass means providing substantially unrestricted movement of the piston in the other direction, a connection between the tool holder and the piston for moving the piston with the tool holder in the one direction relative to the cylinder upon advancing movement of the tool holder and for moving the tool holder independently of the piston upon retracting movement of the tool holder, and means for moving the piston in the other direction relative to the cylinder.

30. In an automatic drilling machine of the type employing a high speed elongated drill of small diameter relative to its length, a frame, a rotatable spindle for holding the drill, means for mounting the spindle for reciprocating movement relative to the frame, a fluid pressure actuated piston movable in a cylinder and operatively connected to the spindle for advancing the spindle relative to the frame from a retracted position upon fluid under pressure energization of the cylinder on one side of the piston and exhausting fluid under pressure from the cylinder on the other side of the piston and for retracting the tool holder relative to the frame from an advanced position to the retracted position upon fluid under pressure energization of the cylinder on the other side of the piston and exhausting fluid under pressure from the cylinder on the one side of the piston, a support for the drill, the support including a pair of spaced bushings each having a bore corresponding to the diameter of the drill, means for mounting the support on the frame relative to the spindle with the longitudinal axes of the bores parallel to and concentric with the longitudinal axis of the drill and with the drill extending into the bore of one of the bushings upon the spindle being reciprocated to the retracted position and with the drill traversing the space between the bushings and entering the bore of the other bushing upon the spindle being reciprocated from the retracted position to an advanced position, means for introducing fluid under pressure exhausted from the cylinder on the one side of the piston into the space between the bushings and across the path of the drill, and means for utilizing fluid under pressure exhausted from the cylinder on the other side of the piston to introduce a lubricant into the space between the bushings and across the path of the drill.

31. In an automatic drilling machine of the type employing a high-speed elongated drill of small diameter relative to its length, a frame, a rotatable spindle for holding the drill, means for mounting the spindle for reciprocating the spindle between a retracted position and an advanced position, a support for the drill, the support including a pair of spaced bushings each having a bore corresponding to the diameter of the drill, means for mounting the support on the frame with the longitudinal axes of the bores coaxial with the drill and with the drill extending into the bore of one of the bushings upon the spindle being reciprocated to the retracted position, the support having a pair of passageways therethrough disposed at an angle to each other, the passageways intersecting each other and the path of the drill, the bushings being disposed on opposite sides of the intersection of the passageways, each passageway extending a substantial distance on each side of the path of the drill, means for passing cleaning fluid through one of said passageways and across the path of the drill between the bushings, means for passing lubricating fluid through the other of said passageways and across the path of the drill between the bushings, and means for alternately actuating the last two said means.

References Cited in the file of this patent

UNITED STATES PATENTS

| | | |
|---|---|---|
| 599,356 | Reece | Feb. 22, 1898 |
| 897,676 | Thompson | Sept. 1, 1908 |
| 1,317,711 | Landgraf | Oct. 7, 1919 |
| 1,422,031 | Caulkins | July 4, 1922 |
| 1,507,394 | Meinersmann | Sept. 2, 1924 |
| 1,630,835 | Doyle | May 31, 1927 |
| 1,677,889 | Gairing | July 24, 1928 |
| 1,837,419 | Ertel | Dec. 22, 1931 |
| 1,911,138 | Clute et al. | May 23, 1933 |
| 2,079,640 | Vickers et al. | May 11, 1937 |
| 2,165,485 | Jackman | July 11, 1939 |
| 2,324,727 | Shartle | July 20, 1943 |
| 2,420,521 | Copler et al. | May 13, 1947 |
| 2,488,620 | Evenstad et al. | Nov. 22, 1949 |
| 2,490,120 | Ellison et al. | Dec. 6, 1949 |
| 2,515,383 | Sneva | July 18, 1950 |
| 2,552,463 | Searles | May 8, 1951 |
| 2,631,480 | Romine et al. | Mar. 17, 1953 |
| 2,657,595 | Shaff | Nov. 3, 1953 |
| 2,807,176 | Butcher et al. | Sept. 24, 1957 |